(12) United States Patent
Coley

(10) Patent No.: US 7,933,228 B2
(45) Date of Patent: Apr. 26, 2011

(54) TIME SENSITIVE SCHEDULING DATA DELIVERY NETWORK

(75) Inventor: Robert Bernard Coley, Palo Alto, CA (US)

(73) Assignee: Keep In Touch Services, Inc., Palo Alto, CA (US)

( * ) Notice: Subject to any disclaimer, the term of this patent is extended or adjusted under 35 U.S.C. 154(b) by 238 days.

(21) Appl. No.: 12/287,209

(22) Filed: Oct. 7, 2008

(65) Prior Publication Data

US 2009/0092139 A1    Apr. 9, 2009

Related U.S. Application Data

(60) Provisional application No. 60/998,411, filed on Oct. 9, 2007.

(51) Int. Cl.
*H04J 1/16* (2006.01)
*H04L 12/56* (2006.01)

(52) U.S. Cl. ........ 370/278; 370/252; 370/329; 370/386; 370/487

(58) Field of Classification Search .................. 370/252, 370/278, 329, 386, 487
See application file for complete search history.

(56) References Cited

U.S. PATENT DOCUMENTS

| | | | |
|---|---|---|---|
| 5,845,257 A | 12/1998 | Fu et al. | |
| 6,198,696 B1 | 3/2001 | Korpi et al. | |
| 6,658,000 B1 * | 12/2003 | Raciborski et al. | 370/386 |
| 6,973,436 B1 | 12/2005 | Shkedi | |
| 7,007,074 B2 | 2/2006 | Radwin | |
| 7,197,635 B2 | 3/2007 | Keohane et al. | |
| 7,219,109 B1 | 5/2007 | Lapuyade et al. | |
| 2001/0049617 A1 | 12/2001 | Berenson et al. | |
| 2002/0010803 A1 | 1/2002 | Oberstein et al. | |
| 2002/0024536 A1 | 2/2002 | Kahan et al. | |
| 2002/0029238 A1 | 3/2002 | Okuhata | |
| 2002/0123912 A1 | 9/2002 | Subramanian et al. | |
| 2002/0184321 A1 | 12/2002 | Fishman et al. | |
| 2002/0194246 A1 | 12/2002 | Moskowitz et al. | |
| 2003/0005134 A1 | 1/2003 | Martin et al. | |

(Continued)

FOREIGN PATENT DOCUMENTS

KR    1999-0014543 A    2/1999

(Continued)

OTHER PUBLICATIONS

U.S. Appl. No. 12/287,209, filed Oct. 7, 2008, Robert Bernard Coley.

(Continued)

*Primary Examiner* — John Pezzlo
(74) *Attorney, Agent, or Firm* — David Lewis

(57) ABSTRACT

Communications network based passive delivery of time sensitive scheduling data to an entity is described. Specific time sensitive scheduling data streams are created from aggregating time sensitive scheduling data from multiple originating organizations, affiliated groups of individuals, and individuals. Specific time sensitive scheduling data from originating organizations, affiliated groups of individuals, and individuals are sent via the passive delivery communications network. Specific time sensitive scheduling data streams aggregated from the multiple originating organizations, affiliated groups of individuals, and individuals are transmitted via the passive delivery communications network to the entity based on desirability and relevancy of time sensitive scheduling data. Specific time sensitive scheduling data from originating organizations, affiliated groups of individuals, and individuals are received via the passive delivery communications network. The passive delivery of time sensitive scheduling data to the entity is accommodated based upon derived interests of the entity via a time sensitive scheduling data receiving device.

35 Claims, 18 Drawing Sheets

U.S. PATENT DOCUMENTS

| | | |
|---|---|---|
| 2003/0018613 A1 | 1/2003 | Oytac |
| 2003/0018724 A1 | 1/2003 | Mathewson, II et al. |
| 2003/0018778 A1 | 1/2003 | Martin et al. |
| 2003/0154116 A1 | 8/2003 | Lofton |
| 2003/0204585 A1 | 10/2003 | Yao et al. |
| 2003/0229900 A1* | 12/2003 | Reisman .................. 725/87 |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0215509 A1 | 10/2004 | Perry |
| 2004/0243422 A1 | 12/2004 | Weber et al. |
| 2004/0267725 A1 | 12/2004 | Harik et al. |
| 2005/0021403 A1 | 1/2005 | Ozer et al. |
| 2005/0050027 A1 | 3/2005 | Yeh et al. |
| 2005/0050097 A1 | 3/2005 | Yeh et al. |
| 2005/0065844 A1 | 3/2005 | Raj et al. |
| 2005/0071224 A1 | 3/2005 | Fikes et al. |
| 2005/0114777 A1 | 5/2005 | Szeto |
| 2005/0125289 A1 | 6/2005 | Beyda et al. |
| 2005/0125290 A1 | 6/2005 | Beyda et al. |
| 2005/0144073 A1 | 6/2005 | Morrisroe et al. |
| 2005/0144246 A1 | 6/2005 | Malik |
| 2005/0149395 A1 | 7/2005 | Henkin et al. |
| 2005/0154746 A1 | 7/2005 | Liu et al. |
| 2005/0160083 A1 | 7/2005 | Robinson |
| 2005/0165615 A1 | 7/2005 | Minar |
| 2005/0165643 A1 | 7/2005 | Wilson et al. |
| 2005/0165644 A1 | 7/2005 | Beyda et al. |
| 2005/0166233 A1 | 7/2005 | Beyda et al. |
| 2005/0171832 A1 | 8/2005 | Hull et al. |
| 2005/0177385 A1 | 8/2005 | Hull et al. |
| 2005/0204381 A1 | 9/2005 | Ludvig et al. |
| 2005/0210138 A1 | 9/2005 | Zigmond et al. |
| 2005/0216335 A1 | 9/2005 | Fikes et al. |
| 2005/0222901 A1 | 10/2005 | Agarwal et al. |
| 2005/0222989 A1 | 10/2005 | Haveliwala et al. |
| 2005/0246736 A1 | 11/2005 | Beyda et al. |
| 2006/0020596 A1 | 1/2006 | Liu et al. |
| 2006/0026071 A1 | 2/2006 | Radwin |
| 2006/0053076 A1 | 3/2006 | Kremen |
| 2006/0068812 A1 | 3/2006 | Carro et al. |
| 2006/0069612 A1 | 3/2006 | Hurt et al. |
| 2006/0069687 A1 | 3/2006 | Cui et al. |
| 2006/0085829 A1 | 4/2006 | Dhodapkar et al. |
| 2006/0129451 A1 | 6/2006 | Kohanim et al. |
| 2006/0136121 A1 | 6/2006 | Eisen |
| 2006/0167747 A1 | 7/2006 | Goodman et al. |
| 2006/0171257 A1 | 8/2006 | Cormier et al. |
| 2006/0241998 A1 | 10/2006 | Rokosz et al. |
| 2007/0129817 A1 | 6/2007 | Cadiz et al. |
| 2007/0214188 A1 | 9/2007 | Lapuyade et al. |
| 2010/0250497 A1* | 9/2010 | Redlich et al. ................ 707/661 |

FOREIGN PATENT DOCUMENTS

| | | |
|---|---|---|
| KR | 2000-0049922 A | 8/2000 |
| KR | 10-2001-0104857 A | 11/2001 |
| KR | 2002-0035530 A | 5/2002 |
| KR | 10-2003-0079837 A | 10/2003 |
| KR | 10-2005-0097741 A | 10/2005 |
| KR | 10-2006-0075986 A | 7/2006 |
| WO | WO/2006/073543 | 7/2006 |
| WO | WO/2009/048550 | 4/2009 |
| WO | WO/2009/054927 | 4/2009 |
| WO | WO/2009/054928 | 4/2009 |
| WO | WO/2009/085115 | 7/2009 |
| WO | WO/2009/085116 | 7/2009 |

OTHER PUBLICATIONS

PCT/US2008/011542, filed Oct. 7, 2008, Robert Bernard Coley.
U.S. Appl. No. 12/288,236, filed Oct. 17, 2008, Robert Bernard Coley.
PCT/US2008/011937, filed Oct. 19, 2008, Robert Bernard Coley.
U.S. Appl. No. 12/288,394, filed Oct. 19, 2008, Robert Bernard Coley.
PCT/US2008/011938, filed Oct. 19, 2008, Robert Bernard Coley.
U.S. Appl. No. 12/316,333, filed Dec. 10, 2008, Robert Bernard Coley.
PCT/US2008/013584, filed Dec. 10, 2008, Robert Bernard Coley.
U.S. Appl. No. 12/316,334, filed Dec. 10, 2008, Robert Bernard Coley.
PCT/US2008/013585, filed Dec. 10, 2008, Robert Bernard Coley.

* cited by examiner

TIME SENSITIVE SCHEDULING DATA DELIVERY NETWORK

CROSS-REFERENCE TO RELATED APPLICATIONS

This application claims priority benefit of U.S. Provisional Patent Application No. 60/998,411, entitled, "TIME SENSITIVE SCHEDULING DATA DELIVERY NETWORK," by Robert B. Coley, filed Oct. 9, 2007, which is incorporated herein by reference in its entirety.

BACKGROUND OF THE INVENTION

1. Field of the Invention

The invention relates to information retrieval and dissemination technologies, internet data publication techniques and targeted communications.

2. Description of the Related Art

At present, when an individual wants to refer to or retrieve personally relevant scheduling information, the individual must have 1) manually collected the information from various sources and manually recorded the information on paper, 2) entered the manually collected information in a calendaring/time management software product and recalled the information entered, 3) utilized another individual (a personal assistant) to collect and aggregate the information, then refer to paper or display output, 4) called the source or keeper of the time sensitive scheduling data and request the information about the event or meeting, or 5) utilized a company partitioned group calendaring/time management software product which is restricted to company relevant activities and refer to a group enabled calendar.

It is difficult for individuals using such currently available methods to maintain their personal calendars and/or schedules that require the initiation and management of the aggregation of time sensitive scheduling data from many sources that impact their daily lives. Often, for the most important time sensitive scheduling information, the individual must be present at the meeting (scheduling session), must be a party at the appointment (e.g., medical consultation) or must be represented at the scheduling session (e.g., posting of exam testing schedules). For an individual not directly involved with the source organization, the individual must scan general publication sources manually or electronically to discover events or meeting of interest, then transfer the data to their personal calendaring/scheduling records for later retrieval.

SUMMARY OF THE INVENTION

The present disclosure accommodates the delivery of time sensitive scheduling data to an entity via a communications network.

In one embodiment of the invention, communications network based passive delivery of time sensitive scheduling data to an entity, comprises aggregating time sensitive scheduling data from multiple originating organizations, affiliated groups of individuals, and individuals that create specific time sensitive scheduling data streams, sending via a passive delivery communications network specific time sensitive scheduling data from originating organizations, affiliated groups of individuals, and individuals, transmitting via the passive delivery communications network specific time sensitive scheduling data streams aggregated from multiple originating organizations, affiliated groups of individuals, and individuals to the entity based on desirability and relevancy of high utility time sensitive scheduling data, receiving via the passive delivery communications network specific time sensitive scheduling data from originating organizations, affiliated groups of individuals, and individuals, and accommodating the passive delivery of time sensitive scheduling data to the entity based upon the derived interests of the entity via a time sensitive scheduling data receiving device.

In another embodiment of the invention, the time sensitive scheduling data as described above consists of data relating to the class of entity activities selected from the group consisting of attending, timely participating, scheduling, planning, organizing, timely responding, reserving, and a combination thereof. The class of entity activities originates from the class of time sensitive scheduling data activity sources selected from the group consisting of standard events, standard meetings, ad hoc activities, observances, and a combination thereof.

In another embodiment of the invention, the passive delivery of time sensitive scheduling data may include deriving interest for targeting a receiving entity based on information from provider organization's membership rolls and affiliation rolls as they pertain to entity affiliation items selected from the group consisting of entity-to-organization affiliations, entity-to-group affiliations, entity-to-individual affiliations, attributes from the organization's profile of the entity, and a combination thereof.

In another embodiment of the invention, the passive delivery of time sensitive scheduling data may include deriving interest for targeting a receiving entity wherein the derived interest is selected from the group consisting of the entity's filtering of time sensitive scheduling data, the entity's selection of promotional content accompanying the display of time sensitive scheduling data, the entity's tagging certain time sensitive scheduling data items for reminder notices of upcoming activities and observances, the entity's reservations notices for upcoming activities, the entity's need to know, and the entity's affinity groups.

In another embodiment, a system for communications network based passive delivery of time sensitive scheduling data via a communication technology via a time sensitive scheduling receiving device to an entity is described. The system may include a time sensitive scheduling data center for storing time sensitive scheduling data, collecting time sensitive scheduling from an entity, and sending time sensitive scheduling data to the entity upon the entity being authenticated and validated, connectivity medium communication interfaces for transmitting authentication and validation information and time sensitive scheduling data between the time sensitive scheduling data center, a communication technology, and a time sensitive scheduling receiving device, and a communication technology suitable for receiving and sending the passive delivery of time sensitive scheduling data. The system may also include processors for processing executable instructions for aggregating time sensitive scheduling data from multiple originating organizations, affiliated groups of individuals, and individuals that create specific time sensitive scheduling data streams, sending via a passive delivery communications network specific time sensitive scheduling data from originating organizations, affiliated groups of individuals, and individuals, transmitting via the passive delivery communications network specific time sensitive scheduling data streams aggregated from multiple originating organizations, affiliated groups of individuals, and individuals to the entity based on desirability and relevancy of high utility time sensitive scheduling data, receiving via the passive delivery communications network specific time sensitive scheduling data from originating organizations, affiliated groups of individuals, and individuals, and accommodating the passive delivery of time sensitive scheduling data to the entity based upon the derived interests of the entity via a time sensitive scheduling data receiving device. Finally, the system may also include a time sensitive scheduling receiving device for receiving and sending authentication and validation information and time sensitive scheduling data to the time sensitive scheduling data center via the connectivity medium communication interfaces via a communication technology.

In another embodiment of the invention, a time sensitive scheduling data receiving device suitable for providing the communications network based passive delivery of time sensitive scheduling data to an entity is described. The device may include a display for displaying a message in accordance with time sensitive scheduling data, a time sensitive scheduling data communication interface arranged to send and receive signals from authentication and fulfillment servers of a time sensitive scheduling data network, a processor for processing executable authentication and validation instructions, and a controller in communication with the processor and the time sensitive scheduling data communication interface arranged to send and receive signals from the authentication and fulfillment servers of the time sensitive scheduling data network to determine if a time sensitive scheduling data receiving entity is authenticated and validated to receive time sensitive scheduling data from the fulfillment server wherein when the controller determines that the time sensitive scheduling data receiving entity is authenticated and validated to receive time sensitive scheduling data from the fulfillment server, then the processor notifies the fulfillment server to send time sensitive scheduling data to the receiving entity via the time sensitive scheduling data communication interface. The time sensitive scheduling data receiving device is selected from the group consisting of non-web browser time sensitive scheduling data receiving devices and web browser time sensitive scheduling data receiving devices.

Another embodiment provides a computer program product executable by a computer processor for processing the passive delivery of time sensitive scheduling data generated via a communications network to an entity. The computer program product may include computer code for aggregating time sensitive scheduling data from multiple originating organizations, affiliated groups of individuals, and individuals that create time sensitive scheduling data streams, computer code for sending via a passive delivery communications network specific time sensitive scheduling data from originating organizations, affiliated groups of individuals, and individuals, computer code for transmitting via the passive delivery communications network specific time sensitive scheduling data streams aggregated from multiple originating organizations, affiliated groups of individuals, and individuals to the entity based on desirability and relevancy of high utility time sensitive scheduling data, computer code for receiving via the passive delivery communications network specific time sensitive scheduling data from originating organizations, affiliated groups of individuals, and individuals, computer code for accommodating the passive delivery of time sensitive scheduling data to the entity based upon the derived interests of the entity via a time sensitive scheduling data receiving device, and a computer readable medium for storing the computer code.

In another embodiment, a system for simultaneous passive delivery of time sensitive scheduling data via multiple communication technologies via an array of multiple communication time sensitive scheduling receiving devices to an entity is described. The system may include a time sensitive scheduling data center for storing time sensitive scheduling data, collecting time sensitive scheduling from an entity, and sending time sensitive scheduling data to the entity upon the entity being authenticated and validated, connectivity medium communication interfaces for transmitting authentication and validation information and time sensitive scheduling data between the time sensitive scheduling data center, multiple communication technologies, and multiple communication time sensitive scheduling receiving devices, multiple communication technologies suitable for receiving and sending the passive delivery of time sensitive scheduling data, processors for processing executable instructions, and multiple communication time sensitive scheduling receiving devices for receiving and sending authentication and validation information and time sensitive scheduling data to the time sensitive scheduling data center via the connectivity medium communication interfaces via multiple communication technologies.

In another embodiment, a fulfillment system is described. The fulfillment system may include a fulfillment server delivering time sensitive scheduling data and business policy determined collateral content to a receiving entity based on applying rules of a time sensitive scheduling data delivery business process according to a receiving entity's affiliations and profile, an authentication server recognizing valid time sensitive scheduling data delivery network receiving entities and issuing authentication keys to valid time sensitive scheduling data delivery network receiving entities independent of the method the receiving entity employs to access the time sensitive scheduling data delivery network to receive a time sensitive scheduling data stream, a web-access server controlling how data is received from and pushed out to web browser devices, a subscriber profile server managing and provisioning of subscription and subscriber profiles, a subscriptions/subscriber server managing and provisioning of subscriber's subscription profiles. The fulfillment system also may include an acquisition system that includes organization data-managed activity acquisitions servers harvesting activity data created and maintained on the server by organization members providing the organization's activity data, individual-managed activity acquisitions servers harvesting activity data recorded and maintained on the server by consuming individuals providing the activity data of other individuals and their own personal activity data, and foreign activity acquisition servers harvesting activity data recorded on the server by organizations providing the activity data of other individuals and other organizations. In addition, the fulfillment system may include a time sensitive scheduling data server assimilating time sensitive scheduling data, fulfilling time sensitive scheduling data requests based on a subscriptions list, and processing time sensitive scheduling data updates, a promotions server managing promotion time sensitive scheduling data from sponsors, promoters, and advertisers, and managing profile descriptors, usage statistics, and request ID, a user relationship server generating statistics, process status and data status for time sensitive scheduling data delivery network user linkage and behavioral data, and lead generation, assimilating usage statistics and behavioral data, administering individual linkage data, storing usage statistics, behavioral data, and individual data updates, a data store, and time sensitive scheduling data receiving devices.

In another embodiment, a system for the passive delivery of targeted time sensitive scheduling data items of derived interest to targeted audiences is described. The system includes personally targeted audiences including individuals to whom specific time sensitive scheduling data and promotional material are streamed based on attributes and preferences explicit in their personal profile in the time sensitive scheduling data delivery network, community of interest target audiences corresponding to audiences who share identified common affiliations deemed significant and to whom specific time sensitive scheduling data and promotion materials are streamed based on their affiliations, common attributes derived for a community group, and specific preferences of significant members of the community group, community nonspecific affiliation target audiences sharing identified common attributes deemed significant and to whom specific time sensitive scheduling data and promotion materials are streamed based on the common attributes and affiliations derived for the community group, and the specific preferences of significant members of the community group, and community occupying a targeted space target audiences sharing a common space at a targeted time deemed significant and to whom specific time sensitive scheduling data and promotion materials are streamed based on occupancy of that space at that time. The common space is selected from the group consisting of a physical space and a virtual space.

In another embodiment, a time sensitive scheduling data activity source system is described. The system includes standard events representing routine and non-routine gatherings of individuals in association for purposes other than conducting the regular business of the associations, standard meetings representing generally recurring gatherings of same individuals for the purpose of conducting the business of the association, observances representing mass recognitions for purposes of commemorating an event or occurrence, and ad hoc activities representing all other pre-announced gatherings of individuals for social purposes. The groups of individuals in association are selected from the group consisting of same groups of individuals in association and ad hoc groups of individuals in association. The mass recognitions are selected from the group consisting of an ad hoc event, ad hoc gatherings of same groups of individuals in association, routine gatherings of same groups of individuals, ad hoc gatherings of ad hoc groups of individuals in association, and routine gatherings of ad hoc groups of individuals in association.

In another embodiment, a system for the passive delivery of aggregated personal time sensitive scheduling data from multiple sources is described. The system includes specific personal time sensitive scheduling data aggregated from multiple originating organizations, affiliated groups of individuals, and individuals to an entity based on desirability and relevancy of high utility time sensitive scheduling data, aggregated specific personal time sensitive scheduling data streams transmitting to the entity based on the time sensitive scheduling data having desirability and relevancy of high utility, and specific personal time sensitive scheduling data delivered to a time sensitive scheduling data receiving device.

Another embodiment provides a system for acquiring time sensitive scheduling data from a combination of time sensitive scheduling data feeds. The system includes product client data feeds from which a time sensitive scheduling data acquisition function acquires time sensitive scheduling data from provider products wherein the data feeds from the provider products are characterized by those applications and activities that produce activity coordination data streams as a by-product of use, embedded data feeds from which the time sensitive scheduling data acquisition function acquires the data feeds from embedded time sensitive scheduling data feed modules wherein the embedded data feeds involve foreign organizations who integrate the time sensitive scheduling data feed modules within their products, purchasing and bartering time sensitive scheduling data feeds from which the time sensitive scheduling data acquisition function acquires the data feeds by purchasing and bartering data feeds, research team scans data feeds from which the time sensitive scheduling data acquisition function acquires the data feeds from research team efforts to scan private and public data sources, and call center survey data feeds from which the time sensitive scheduling data acquisition function acquires the data feeds from call center surveys of clients involving direct contact information transfers. The embedded time sensitive scheduling data feed modules are selected from the group consisting of foreign organization's software, applications, tools, websites, and a combination thereof. The purchased and bartered data feeds are selected from the group consisting of businesses, associations, individuals, and a combination thereof. The private and public data sources are selected from the group consisting of websites, association publications, print media community calendars, and a combination thereof.

Other aspects and advantages of the invention will become apparent from the following detailed description, taken in conjunction with the accompanying drawings, illustrating by way of example the principles of the invention.

BRIEF DESCRIPTION OF THE DRAWINGS

Detailed and specific features of the present invention are more fully disclosed in the following sections, with reference being made to the accompanying drawings, in which:

FIGS. 4-1, 4-2, and 4-3 show a flowchart of a fulfillment process according to one or more embodiments of the invention.

FIGS. 5-1 and 5-2 show a flowchart of the server system according to one or more embodiments of the invention.

DETAILED DESCRIPTION OF THE INVENTION

Reference throughout this specification to "one embodiment" or "an embodiment" means that a particular feature, structure, or characteristic described in connection with the embodiment may be included in at least one embodiment of the present invention. Thus, the appearance of the phrase "in one embodiment" or "an embodiment" in various places throughout this specification does not necessarily refer to the same embodiment. Furthermore, the particular features, structures, or characteristics may be combined in one or more embodiments.

In the following description, for purposes of explanation, numerous details are set forth, such as flow charts and system configurations, in order to provide an understanding of one of more embodiments of the present invention. However, it is and will be apparent to one skilled in the art that these specific details are not required in order to practice the invention.

Accordingly, what is needed is a system that enables individuals to subscribe to a data stream of future events based on entities or groups that they are affiliated and/or with formal organizations or activities they are interested in monitoring. What is further needed is a system where many individuals may take advantage of the recording of time sensitive scheduling data by a single individual anywhere, thereby leveraging the work product of this one individual and reducing the duplication of effort by many other individuals who need/desire the same time sensitive scheduling data. In addition, there is a need for a system that allows an entity to retrieve individually relevant time sensitive data of personal interest from many sources repeatedly without ever having to transfer the data to its personal calendaring/scheduling records. In this context, there is a need for a method of subscribing to the efforts of creators/providers/designated recorders of time sensitive scheduling data.

Figure 9:
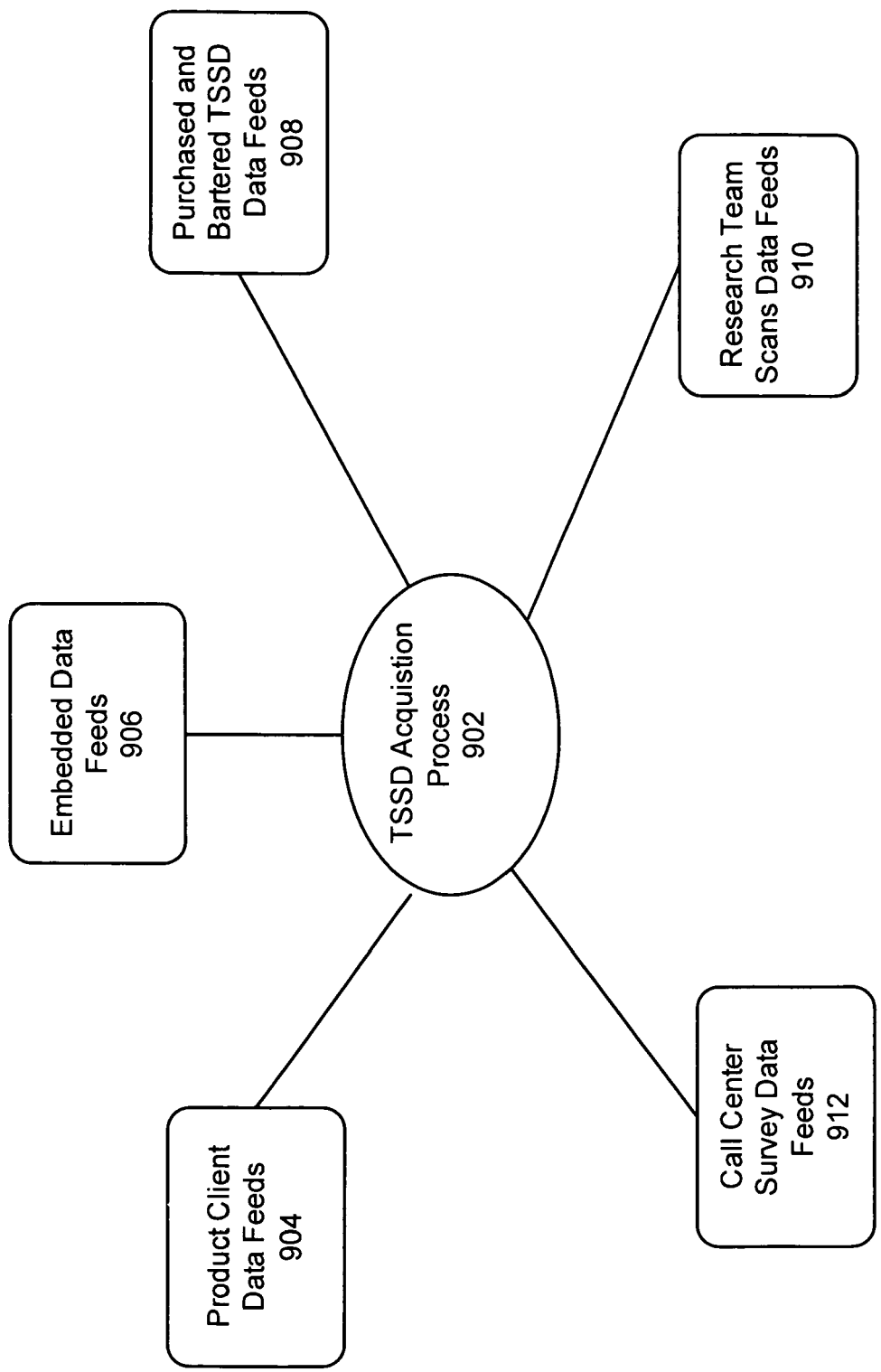
FIG. 9 is a class diagram of primary sources viz., time sensitive scheduling data feeds for a time sensitive scheduling data acquisition process from a business process view point according to one embodiment of the invention.
Figure 10:
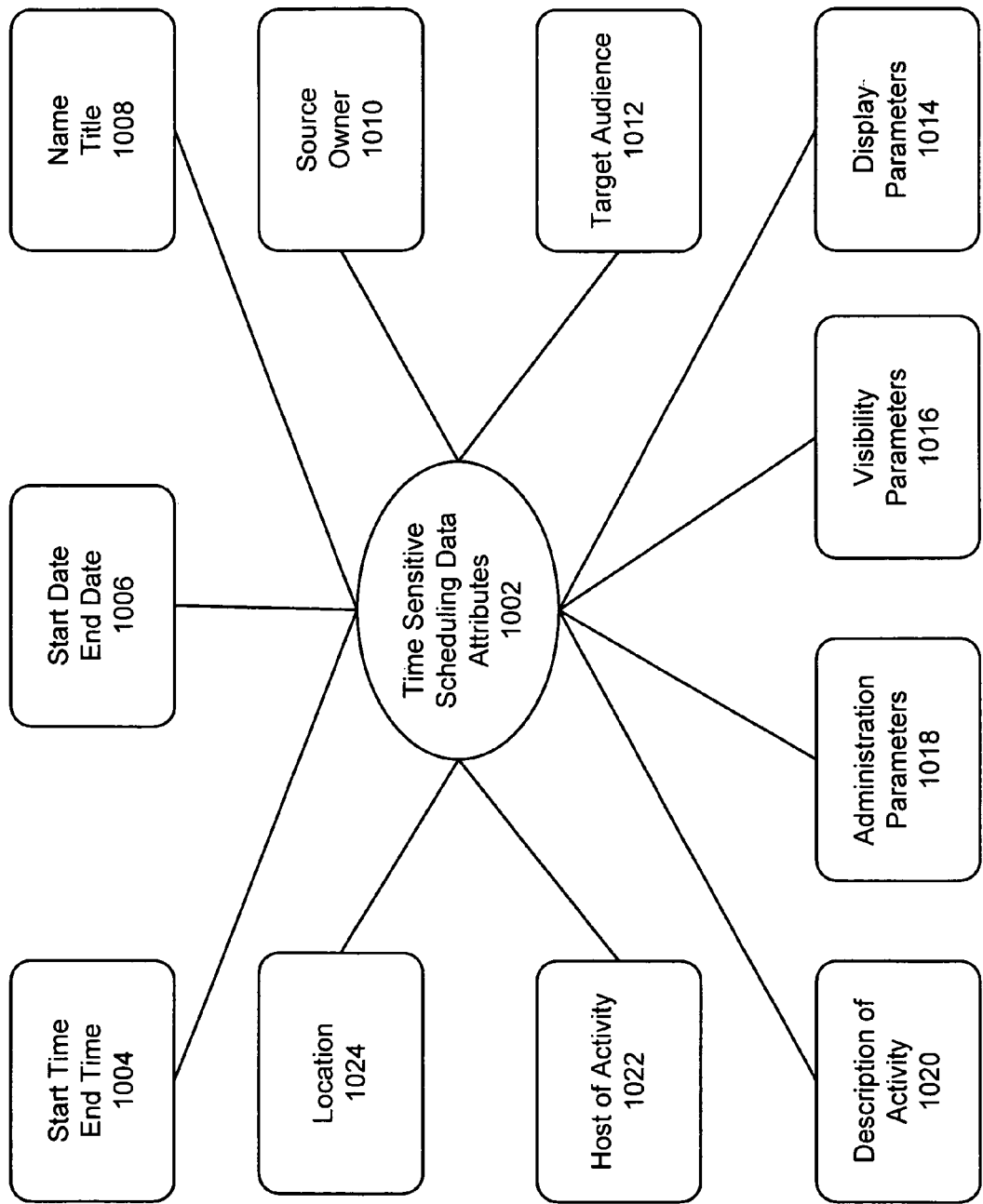
FIG. 10 is an objects diagram illustrating basic attributes of time sensitive scheduling data according to an embodiment of the invention.

In the time sensitive scheduling data delivery network the components are a type of activity data referred to as time sensitive scheduling data (TSSD) described herein, a set of functions which can encompass the collection, storage, maintenance and orderly dissemination of TSSD, hardware and software which can perform these functions and entities which can produce and consume TSSD. Following the definitional description of components below, an overview of the TSSD delivery network is provided in several formats: functional data dissemination and services overview FIG. 5-1 and FIG. 5-2, a communications system components overview FIG. 1A and FIG. 1B, a portal display communications overview FIG. 2, a fixed display location communications overview FIG. 3, and a data display fulfillment subsystem overview FIG. 4-1, FIG. 4-2, and FIG. 4-3. Figures describing users states FIG. 7, classes of participants FIG. 11A, target audiences FIG. 11B, and TSSD providers FIG. 11C are shown according to one or more embodiments of the invention. Next classes of TSSD activity sources FIG. 6, basic TSSD attributes FIG. 10, TSSD fulfillment functions FIG. 8, and TSSD acquisition processes FIG. 9 are shown according to one or more embodiments of the invention.

DEFINITIONS

As used in this description and the accompanying claims, the following terms shall have the meanings indicated, unless the context otherwise requires.

Figure 6:
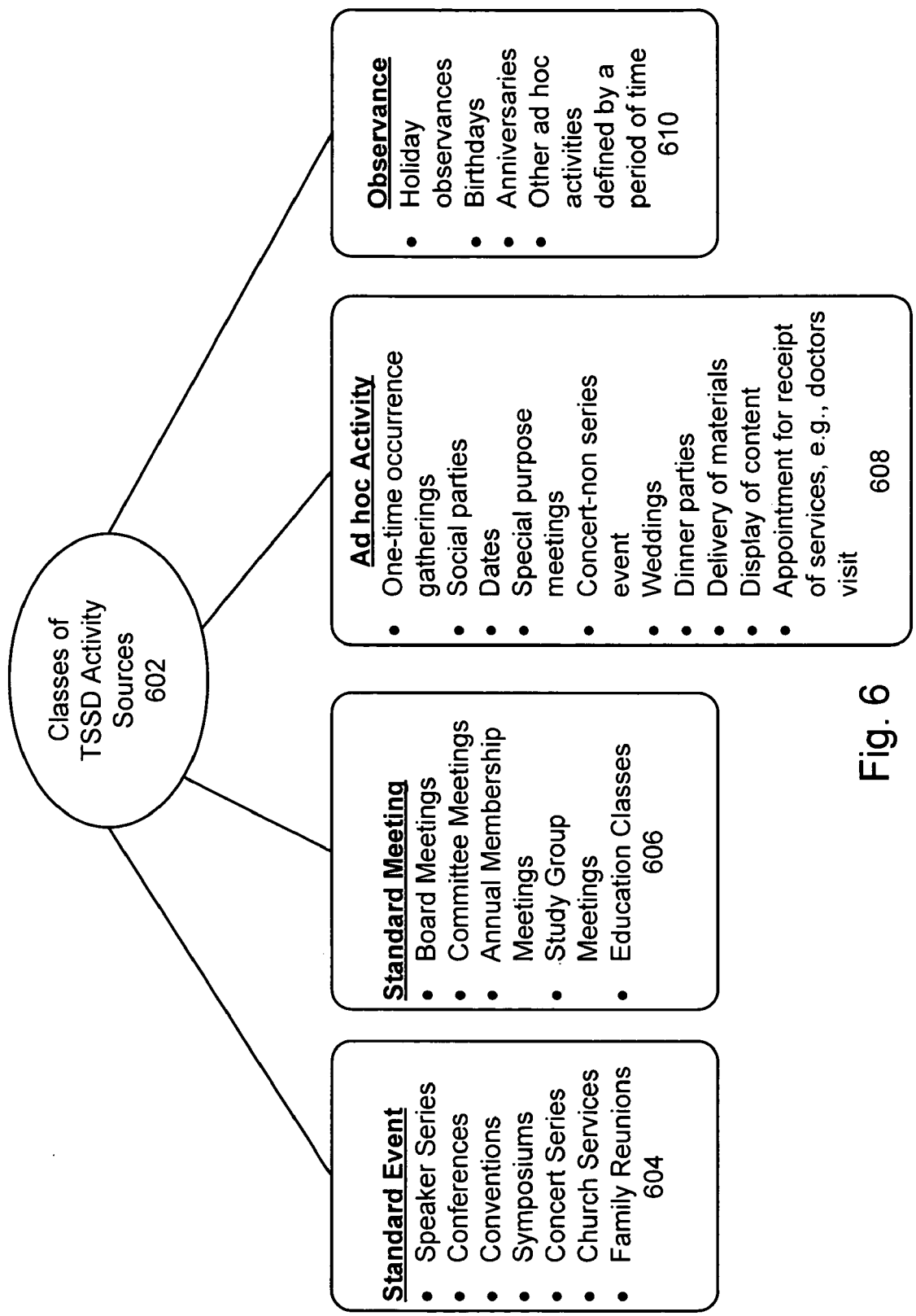
FIG. 6 is a class diagram illustrating classes of time sensitive scheduling data Activity Sources according to one embodiment of the invention.

"Time sensitive scheduling data (TSSD)" may refer to data relating to the class of entity activities including attending, timely participating, scheduling, planning, organizing, responding and reserving. The TSSD originates from the class of TSSD activity sources including standard events, standard meetings, ad hoc activities, and observances. This TSSD data has high utility and is frequently referenced in its relationship to an individual's continually changing activities. Also such data is not of transitory interest to users, since checking one's schedule is a necessary activity that an individual does numerous times on a daily basis. In FIG. 6 is a class diagram that illustrates the sources for TSSD activities. An objects diagram in FIG. 10 illustrates the basic attributes for TSSD.

"Channel" may refer to a data stream containing one or more "profiled" (selected based on specific criteria which may include affiliation, derived interests, time frame, geographic basis of source and type of TSSD) and prioritized feed packets of content.

"Cloud" may refer to homogeneous groups of cooperating networks which deliver data from a source to a destination via one or more paths that may generally be determined by the cooperating networks components, and not by the originating source device or the destination receiving device. It should be appreciated that the path by which the data reaches the source may be unpredictable or unidentifiable in advance.

"Entity" may refer to consuming entities whose actions consume time sensitive scheduling data, producing entities whose activities produce time sensitive scheduling data, providing entities who submit time sensitive scheduling data intended for consumption by other entities, and receiving entities who control what is received and presented on the time sensitive scheduling data receiving device used for consumption of time sensitive scheduling data by entities. The consuming entities may include individual members or affiliates of time sensitive scheduling data delivery network client organizations, interested individuals who browse time sensitive scheduling data network communications sites, time sensitive scheduling data delivery network subscribers, members or affiliates of entities displaying time sensitive scheduling data activity feeds, and individuals passing by areas display time sensitive scheduling data activity feeds. The producing entities may include individuals, members of formal organizations, staffs of formal organizations, affiliated groups of individuals, viewers from non-affiliated groups, individuals in common interest groups, and individuals in a common space at the same time. Both the providing entities and receiving entities may include individuals, members of formal organizations, staffs of formal organizations, members of affiliated groups of individuals in non-formal organizations, and individuals in common interest groups.

"Connectivity medium" may refer to a medium (e.g., air, wire, or fiber) between two or more nodes that provides a communication network with a channel. In the present disclosure the connectivity medium may function as a channel that communicates the required request, credentials, and keys that allow for the movement of TSSD.

"Distribute TSSD" may refer to the streaming of TSSD data to TSSD receiving devices when a specific profile match or a specific affiliation match is present or the receiving entity is known to the TSSD providing entity.

"Disseminate TSSD" may refer to the streaming of TSSD to TSSD receiving devices when a specific profile match or a specific affiliation match may not be present or the receiving entity is unknown to the TSSD providing entity.

"Feed" may refer to a data stream containing one or more specific categories of content. Individual units of content may be designated as feed packets or payloads. Each feed may comprise a set of rules for pulling TSSD out of the data store.

"Need to Know data" may refer to data pertaining to activities or events which impact the health and safety of an individual, a community's members, an individual's relations or a specific group of individuals. Need to know time sensitive scheduling data may include activities which are generally non-routine, unscheduled or unplanned activities. Need to know time sensitive scheduling data may be data such as the occurrence of a natural disaster and its related recovery activities: opening of shelters, delivery schedule of food, water and supplies, and opening of relief services offices. Other examples may include road opening and closing schedules, school or public service office opening and closing schedules.

"Network" may refer to groups of computers, terminals, phones, cameras, and linking communications devices which may include routers, switches, hubs, antennas, and relays linked by wired or wire-less telecommunications systems for the purpose of exchanging data. Network as used herein may generally refer to a group of devices working together for a specific purpose involving the exchange of data.

"Server" may relate to any combination of computer hardware or dedicated computing device(s) and software which has one of its functions the collection, storing, aggregation, packaging and/or dissemination of a specific class of data upon request. In one embodiment, a combination which comprises a server may be based on the homogenous data or data formats that are extracted from storage manipulated if necessary by some set of rules or policies and "served up" upon request from one or more entities or functions which consume the data to perform its processes. A single computer may host (provide) several server functions and a single server function may be hosted (shared/provided) by more than one computer or dedicated computing device.

An "activity acquisition" server may relate to a server which functions to harvest, aggregate and/or manipulate TSSD activity data.

An "organization-managed" activity acquisition server may relate to an activity acquisition server where the activity data harvested by such server may have been created and maintained on the server by any or all members of the organization providing the organization's activity data and the organization takes responsibility for the content of the activity data (e.g., activity name, description, activity date, activity time, activity location, attendee policy and fees).

An "individual-managed" activity acquisition server may relate to an activity acquisition server where the activity data harvested by such server is either 1) is the activities of others, i.e., not originated by the consuming individual, but is recorded and maintained on the server by the individual providing the activity data or 2) is the personal activities of consuming individual and the individual takes responsibility for the content of the activity data (e.g., activity name, description, activity date, activity time, activity location, attendee policy and fees).

A "foreign" activity acquisition server may relate to an activity acquisition server where the activity data harvested by such server is the activities not of the providing organization, but of others, i.e., not originated by the organization providing the data. The activity data may be recorded, but not maintained on the server by the organization providing the activity data.

"Site" may refer to a reception zone for the receipt of TSSD that is cross-platform and cross-technology (e.g. web, handheld mobile devices, TV, kiosks, cellular phones, and other similar devices).

"Transmit" may refer to transfer data from one device to another device via one or more communications protocols, one or more communications media and one or more communication applications which facilitate the transfer of data across communications media by implementing one or more communications protocols. In an embodiment of the invention, TSSD and related collateral data can be transmitted via email, http protocol to a host browser over the Internet, via cellular or other telephony text messaging systems, via voice over a telephony network, over broadcast systems for radio, TV, cable and satellite and over evolving systems for extending the internet: Wi-Fi networks, public utility electrical systems, fiber optic communications systems, microwave communications, photoelectric communication system and wired local area networks.

In another embodiment of the invention, the passive delivery of the time sensitive scheduling data to the entity as described above may include the entity not having identified in advance the specific time sensitive scheduling data items delivered, not having requested the specific time sensitive scheduling data items which are transmitted based on a receiving device and consumer profile, and not having any content control of the specific time sensitive scheduling data items which have been delivered in advance of the time sensitive scheduling data items presentation.

In another embodiment of the invention, the passive delivery of the time sensitive scheduling data to the entity as described above may include the entity yielding control over the specific time sensitive scheduling data items selected for delivery, yielding control over the volume of time sensitive scheduling data items delivered, yielding control over how much information is delivered about the specific time sensitive scheduling data items, and yielding control over delivery time.

In another embodiment of the invention, the passive delivery of the time sensitive scheduling data to the entity as described above may include time sensitive scheduling data items selected for delivery based on the entity's derived interest and need to know related to the public health and safety of the entity and entity's current condition and state being impacted by the public health and safety issue.

In another embodiment of the invention, the time sensitive scheduling data items delivered as described above are selected from the group consisting of being known or unknown to a consuming entity in advance of their presentation, being not provided by the consuming entity, being targeted directly or indirectly at the consuming entity as a member of a class possessing specific attributes by the providing entities, belonging to a time sensitive scheduling data channel which has been subscribed to by the consuming entity, belonging to a time sensitive scheduling data channel which has been assigned to the consuming entity, pertaining to the time frame being presented by the time sensitive scheduling data receiving device, and a combination thereof.

According to another embodiment of the invention, an entity may include consuming entities whose actions consume time sensitive scheduling data, producing entities whose activities produce time sensitive scheduling data, providing entities who submit time sensitive scheduling data intended for consumption by other entities, and receiving entities who control what is received and presented on the time sensitive scheduling data receiving device used for consumption of time sensitive scheduling data by entities. The consuming entities may include individual members or affiliates of time sensitive scheduling data delivery network client organizations, interested individuals who browse time sensitive scheduling data network communications sites, time sensitive scheduling data delivery network subscribers, members or affiliates of entities displaying time sensitive scheduling data activity feeds, individuals passing by areas displaying time sensitive scheduling data activity feeds, and a combination thereof. The producing entities may include individuals, members of formal organizations, staffs of formal organizations, affiliated groups of individuals, viewers from non-affiliated groups, individuals in common interest groups, individuals in a common space at the same time, and a combination thereof. Both the providing entities and receiving entities may include individuals, members of formal organizations, staffs of formal organizations, members of affiliated groups of individuals in non-formal organizations, individuals in common interest groups, and a combination thereof.

In another embodiment of the invention, the specific time sensitive scheduling data sent and received may be related to activities of at least one of originating organizations, affiliated groups of individuals, and individuals.

In another embodiment of the invention, the specific time sensitive scheduling data streams transmitted may be an aggregation of activities for a specific time frame related to sources including at least one of the group of an originating organization, an affiliated group of individuals, and an individual.

In another embodiment of the invention, the specific time sensitive scheduling data streams transmitted may be an aggregation of classes of time sensitive scheduling data for a specific time frame.

In another embodiment of the invention, the specific time sensitive scheduling data streams transmitted comprise as at least one individual item.

In another embodiment of the invention, the time sensitive scheduling data aggregated may include specific time sensitive scheduling data aggregated from formal organizations, associated groups of individuals, and individuals distributed directly to a known entity who has a derived interest selected from the group consisting of known interest in the time sensitive scheduling data generated, unrealized interest in the time sensitive scheduling data generated, and a combination thereof.

In another embodiment of the invention, the time sensitive scheduling data aggregated may include specific time sensitive scheduling data aggregated from formal organizations, associated groups of individuals, and individuals disseminated directly to unknown individuals who have a derived interest selected from the group consisting of known interest in the time sensitive scheduling data generated, unrealized interest in the time sensitive scheduling data generated, and a combination thereof.

Another embodiment of the invention relates to accommodating the targeted delivery of time sensitive scheduling data to a presentation device at a location where viewers matching a specific profile are trafficking.

Another embodiment of the invention relates to accommodating the delivery of time sensitive scheduling data to a communications presentation in response to an occurrence of a specific event.

Another embodiment of the invention relates to accommodating the delivery of time sensitive scheduling data to an audio device in response to an occurrence of a specific event.

In another embodiment of the invention, accommodating the delivery of time sensitive scheduling data may include targeting the delivery of time sensitive scheduling data according to area of derived interest of the entity.

In another embodiment of the invention, accommodating the delivery of time sensitive scheduling data may include targeting the delivery of time sensitive scheduling data according to affiliation between entities.

In another embodiment of the invention, accommodating the delivery of time sensitive scheduling data may include targeting the delivery of time sensitive scheduling data according to entity's reminders.

In another embodiment of the invention, accommodating the delivery of time sensitive scheduling data may include targeting the delivery of time sensitive scheduling data according to entity's reservations.

In another embodiment of the invention, accommodating the delivery of time sensitive scheduling data may include targeting the delivery of time sensitive scheduling data according to entity's need to know.

In another embodiment of the invention, accommodating the delivery of time sensitive scheduling data may include targeting the delivery of time sensitive scheduling data according to entity's affinities.

In another embodiment of the invention, streaming filtered, time sensitive scheduling data that fall into a specific category of time sensitive scheduling data and area of derived interest of the entity.

In another embodiment of the invention, time sensitive scheduling data streams may be delivered to the entity wherever the entity may be.

In another embodiment of the invention, communications network based passive delivery of time sensitive scheduling data to an entity may further comprise distributing and disseminating time sensitive scheduling data which may automatically provide targeted entities with time sensitive scheduling data of personal interest to facilitate timely attendance and participation in a designated area of derived interest of the entity.

In another embodiment of the invention, communications network based passive delivery of time sensitive scheduling data to an entity may further comprise distributing and disseminating time sensitive scheduling data which may automatically provide targeted entities with time sensitive scheduling data of personal interest to facilitate timely attendance and collaboration in a designated area of affiliation of the entity.

In another embodiment of the invention, communications network based passive delivery of time sensitive scheduling data to an entity may further comprise distributing and disseminating time sensitive scheduling data which may automatically provide targeted entities with time sensitive scheduling data of personal interest to facilitate timely attendance at a designated reservation activity.

In another embodiment of the invention, communications network based passive delivery of time sensitive scheduling data to an entity may further comprise distributing and disseminating time sensitive scheduling data which may automatically provides targeted entities with time sensitive scheduling data of personal interest to facilitate timely follow up activity and collaboration in a designated reminder noticed activity.

In another embodiment of the invention, communications network based passive delivery of time sensitive scheduling data to an entity may further comprise distributing and disseminating time sensitive scheduling data which may automatically provide targeted entities with time sensitive scheduling data of personal interest to facilitate timely activity and collaboration in a designated need to know activity.

In another embodiment of the invention, communications network based passive delivery of time sensitive scheduling data to an entity may further comprise distributing time sensitive scheduling data to targeted entities based on affiliations between the targeted entities.

In another embodiment of the invention, communications network based passive delivery of time sensitive scheduling data to an entity may further comprise distributing time sensitive scheduling data to targeted entities based on targeted entities profiles.

The time sensitive scheduling data delivery network described above may include portable display time sensitive scheduling data receiving devices selected from the group comprising mobile computing devices, personal digital assistants (PDAs), cellular phones, personal computers, portable workstations, and a combination thereof.

The time sensitive scheduling data delivery network may include fixed placement display time sensitive scheduling data receiving devices in display locations selected from the group comprising public place business display screens, home entertainment appliance display screens, business display screens in a public place, business display screens on company property in public areas, business display screens on company property in private areas, and a combination thereof.

The time sensitive scheduling data delivery network may also include linked devices in the fixed placement display time sensitive scheduling data receiving devices selected from the group comprising computers that run a single function TSSD delivery network access software product, computers that run browsers linked into a time sensitive scheduling data display website, computers that run a time sensitive scheduling data tuner and display software, set top tuners for home entertainment appliances, stand alone tuners with web access, and a combination thereof.

The present invention can be implemented in various different forms, including but not limited to: business processes, computer implemented methods, computer program products, computer systems, and communication networks, entity interfaces, application programming interfaces, and the like.

The communications network may include simple devices, advanced devices, individual access devices, and community access devices.

The simple device may be a low-end price competitive device that receives TSSD. It may be able to send a Yes/No indicator in response to something on the device screen. The simple device may also receive TSSD based on who the entity is and/or what the interest profile is of the entity.

The aforementioned advanced device may have all the capabilities of the simple device plus some additional communications capabilities. By way of example, such a device may have a full two-way interactive device. Some of its features may include a larger screen and easy manipulation of on-screen information. The advanced device may come in various sizes and shapes and changes where people may go to get critical information at several points during their day. The embedded systems devices may include cellular phones, PDAs, mobile digital assistants with cellular phones, text messaging devices and PDAs and Java (MIDP-mobile information device profile) enabled devices, multifunction wristwatches, and handheld computing devices.

Individual access devices such as the laptop computer, desk top computer, cellular phone, and PDA may allow a single entity to receive TSSD into a reception zone, often in a web browser format. These individual access devices typically already have web browser capability built-in. One of the access devices in this category is a web browser with a special web interface that is designed to receive TSSD. This mimics the advanced device functions somewhat, except as a web application. Another access device is a cellular phone using the web interface that is now available in many mid-to-high end cellular phones. Another access device is a PDA using the internet interface that is available now in cellular or Wi-Fi connected PDA devices. Other embedded systems devices can use non-web integration.

The community access devices may allow multiple entities to receive TSSD into a reception zone, often in a web browser type format. One of the access devices in this category may be a set top box, for example. The set top box may use the web interface and keyboards that are available with some set top box vendors. This is typically the in-home TV access to TSSD. Another reception zone is a kiosk. This is typically activity data shown in a communal or public area. Vertical kiosk applications come out of this area with payment structures such as from a sponsor paying to the public entity paying. In some parts of the world, this is a substitute for a local or regional newspaper or a way to check on government services without a long wait in lines. A third community reception zone is a broadcast channel which may allow the entity to receive TSSD into a reception zone on a broadcast media channel the entity is watching. These are zones of traveling message data strips on cable channels or more standalone captive areas like airport system screens. The scrolling TSSD seen there is based on location and the business function at that location. The media types for these streams are varied and include internet protocol, telephony, and both on-air cable and private cable.

In a pure push system, content may be streamed to an entity as determined by the providing entity. The entity has the option of consuming (i.e., viewing, listening, or feeling) the content or ignoring the content. In one modified push system, the entity may have the option to block (filter) unwanted content and the providing entity can not override the consuming entity's choice not to receive specific types of content.

In a pure pull system, an entity requests specific available content and the content is streamed to the entity's receiving device for consuming (i.e., viewing, listening, or feeling). In one modified pull system, the entity may request a category of content or specific content, but the providing entity has the option to target specific consumers and thereby filter what is streamed to an entity. The entity cannot override the providing entity's choice not to stream content to the specific entity.

In the TSSD delivery network, the types of data collected from providing entities may include meeting information, event information, and volunteer opportunity information. Based on this type of collected data, public alerts, free public service announcements, paid promotions, and paid advertising can be targeted effectively.

In an embodiment, of the invention, private TSSD may be activity content provided by the ultimate consumer of the TSSD for that consumer's private use. There may not be an intent for this information to be shared with other entities with the possible exception of family members, i.e., pushed on TSSD channels. When an entity is streamed their private TSSD, no filtering need be applied.

In an embodiment of the invention, public TSSD may be activity content provided with the intent of this content being consumed (i.e., viewed, heard, or felt) by affiliated or subscribed entities. The intent may be to inform others by providing this content for distribution to affiliated entities.

In another embodiment, a privacy circle may be a set of one or more entities designated by a private TSSD provider to be treated as a proxy or the same as the entity providing the private TSSD content. Thus, entities of a privacy circle inherit the same attributes and a status as the TSSD providing entity with regards to the specific channel in which that private TSSD is streaming.

The TSSD delivery network can contain within it very valuable data for which advertisers and marketers may pay premium amounts. The TSSD delivery network is rich in information because it may categorize the data automatically along at least three dimensions: profile; behavior; and responses.

In one embodiment, the first dimension may be profiles. All entities may create TSSD having profiles rich in information about what they do via their associations including their derived interests, hobbies' expertise, and similar activities. Entities may include individuals, members of organizations, and organizations. The TSSD communications network based passive delivery method characterizes that information across the TSSD delivery network for advertisers.

According to another embodiment, the second dimension may be behavior. Behavior may include an entity's choice of affiliation. Timely up-to-date information can be implied from entity choices and actions within the TSSD delivery network. For example, the entity that is a member of three organizations gives indicators to three or more major areas of interest because there are profiles on (most) entities within the TSSD delivery network, which include their purpose and mission.

According to another embodiment, the third dimension may be responses. Responding to the advertisements themselves may create additional TSSD for the TSSD delivery network. Valuable response information may then be captured in at least two ways. Many entities will be responding to event and meeting notices that tie them to an area of interest, which can then be used in matching marketing data characteristics to advertisers. And similarly, when an entity sees an advertiser's advertisement or message, the entity can respond usually by going to a more detailed descriptive message. This action may create additional TSSD and a kind of meta-characteristic of interest based on the non-search criteria.

Given a set of characteristics that an advertiser wants to reach, the TSSD communications network based passive delivery method may deliver the advertisement or message via the TSSD delivery network to a metro zone, state, region or to the entire TSSD delivery network, but only to those individuals matching the advertisers' characteristics, for example.

The TSSD fulfillment process may allow promoters to provide subscribers with promotions or advertisements that fall, for example, specifically into their areas of interest. A sponsor or other advertisement placement buyer may pay for these services that result in promotional messages transmitted to hand-held communications devices or other types of devices that have built-in reception capability. This may allow sponsors of an organization to place advertisements for delivery within one association or across the entire TSSD delivery network.

In one embodiment, the TSSD fulfillment process functions may include: 1) obtaining a list of channels; 2) selecting channels; 3) sending device and entity identifiers, and subscription request; 4) storing authorization and decoding keys; 5) requesting a TSSD channel stream; and/or 6) displaying a TSSD channel stream.

According to another embodiment, the TSSD fulfillment process may involve both a modified push system in which content is sent to the entity, and a modified pull system in which the entity requests the content details or opens a gateway to new TSSD content. At any given moment an entity may be receiving pushed content from one or more channels streams based on the list of channels which the entity has authorized, i.e., chosen to monitor. In addition, the same entity may be receiving pushed content which is sponsoring the chosen channel or content which is targeted at the channel.

In the TSSD fulfillment process, the type of data collected from providing entities and streamed to consuming entities may be public or private. In the modified push system, the public TSSD content may be filtered by, for example, TSSD profile category, region purchased and jurisdiction purchased. The private data may be streamed unfiltered, but targeted only to the entity or their designated privacy circle. In the modified pull system, the requested private TSSD content detail may be returned to its entity or their designated privacy circle, but may be blocked from streaming to any other requesting entity. In the modified pull system the requested public TSSD content detail may be returned if the requestor's profile or affiliation meets the targeting criteria of the public TSSD content providing entity.

Figure 1A:
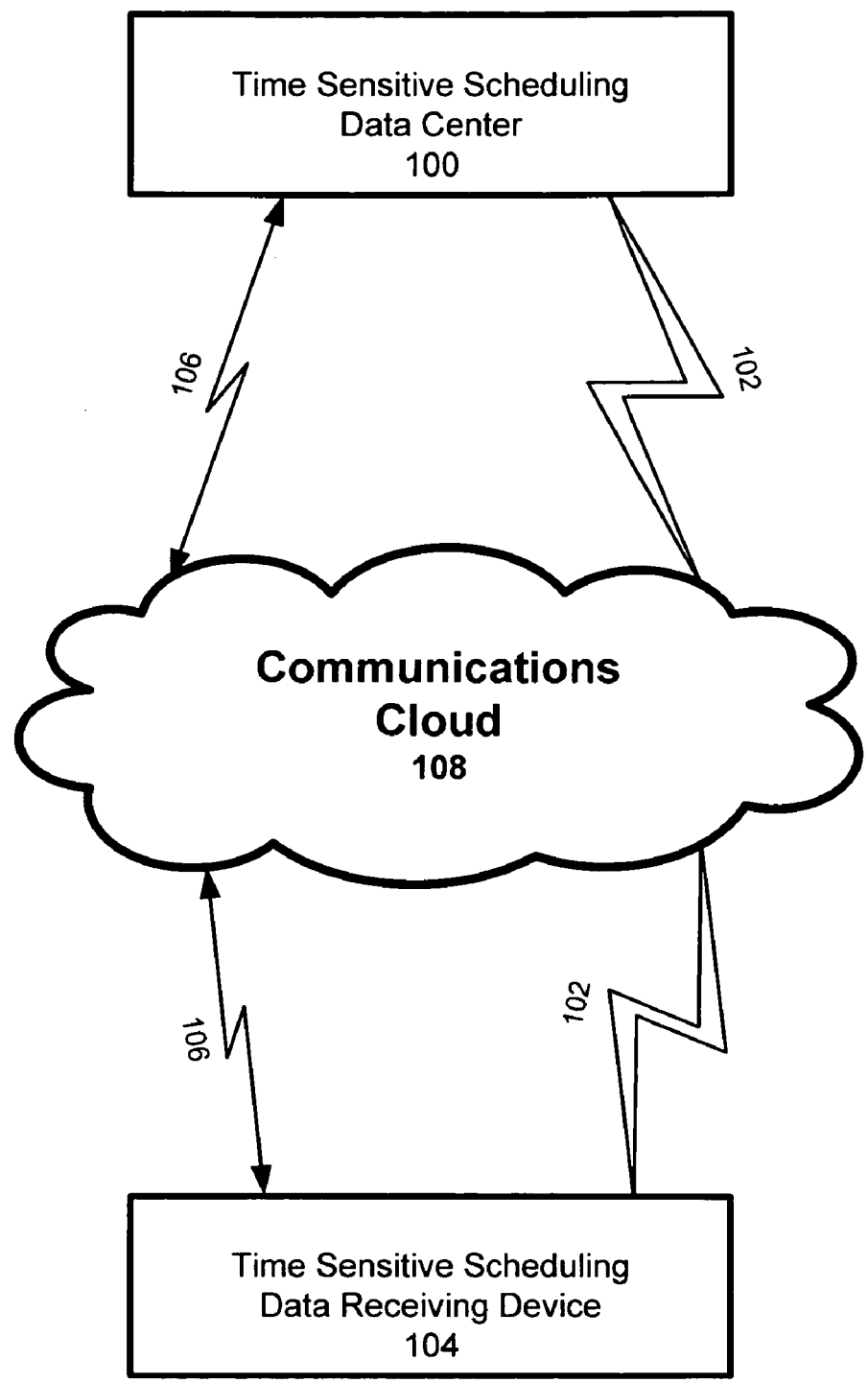
FIG. 1A is a simplified system diagram of a time sensitive scheduling data delivery network according to one embodiment of the invention.

FIG. 1A is a simplified schematic of a communications network configured in accordance with the principles of one embodiment of the invention. In the embodiment of FIG. 1A, a TSSD center 100 can collect and store TSSD via a connectivity medium 102. A TSSD receiving device 104 may then transmit authentication information to the TSSD center 100, via a connectivity medium 106, to a communications cloud 108. The authentication information may contain a subscription fulfillment request, and credentials which include location information (Internet Protocol (IP) address, media access control (MAC) address, mobile identification number (MIN), electronic serial number (ESN), Box ID, subscription channel ID, subscriber ID, or similar ID uniquely identifying the TSSD receiving device 104), and authorization and decoding encryption keys.

The TSSD center 100 may then validate the entity's subscription fulfillment request and credentials received from the communications cloud 108 via the connectivity medium 106. If the credentials are valid, the TSSD via the connectivity medium 102 may be returned to the TSSD receiving device 104 through the communications cloud 108. If the credentials are invalid, a rejection message may be transmitted to the TSSD receiving device 104, via the connectivity medium 106, through the communications cloud 108. The TSSD center 100 streams the TSSD via the connectivity medium 102 related to an organization's, association's, and individual's events, activities, and meetings.

Figure 1B:
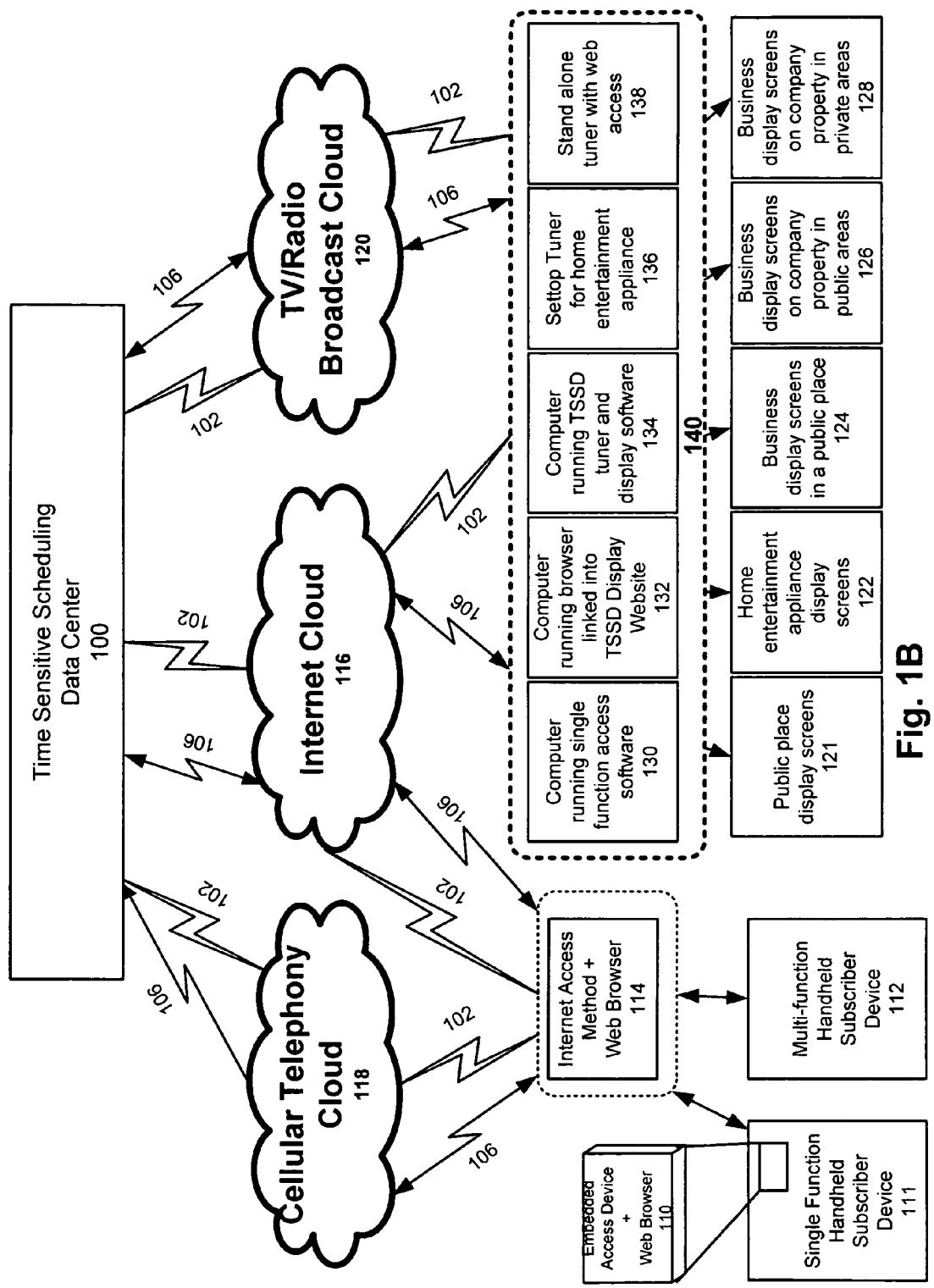
FIG. 1B is a representation of time sensitive scheduling data delivery network and device relationships according to one embodiment of the invention.

FIG. 1B is a representation of a communications network and device relationships configured in accordance with the principles of one embodiment of the invention. In the embodiment of FIG. 1B, the communications cloud 108 may include a cellular telephony cloud 118, an Internet cloud 116, and a TV/Radio broadcast cloud 120 and wherein portable display TSSD receiving devices may include a single function handheld subscriber device 111 and a multifunction handheld subscriber device 112 and fixed placement display TSSD receiving devices 140 may include a public cathode ray tube (CRT), liquid crystal display (LCD), or similar display device such as an electronic billboard, kiosk, or other large screen display.

One type of portable display TSSD receiving device may include the single function handheld subscriber device 111 containing an embedded access device and web browser 110 (software and hardware) which may display entity functions available to the entity, may carry out communications functions, may transmit requests for authorization, may receive authentication information and TSSD, and may display messages or results of the requests. Another type of portable display TSSD receiving device may include the multifunction handheld subscriber device 112 containing the Internet access method and web browser 114 (software and hardware) that may allow the entity to connect to the TSSD center 100. The TSSD center 100 streams TSSD via the connectivity medium 102 related to affiliated organizations', associations', and entity's events, activities, and meetings. The multifunction handheld subscribing device 112 may provide the TSSD center 100 with authentication information based on entity input, and received authorization keys. This device may communicate with the TSSD center 100 via a system of computers, switches, routers, trunks, and other network devices comprising the Internet cloud 116, or via the cellular telephony cloud 118.

The multifunction handheld subscriber device 112 may include a PDA, cellular phone, or personal computer, or other similar device. The portable display TSSD receiving devices may connect to the TSSD center 100 via the Internet access method and web browser 114, which may include wireless fidelity (Wi-Fi) link, cellular phone service, local access network (LAN), broadband link, or other similar methods, and an Internet service provider's (ISP) services.

The portable display TSSD receiving devices may transmit authentication information to the TSSD center 100, via the connectivity medium 106, to the Internet cloud 116 or the cellular telephony cloud 118. The authentication information may contain a subscription fulfillment request and credentials, which may include identification and location information (some or all of the following: IP address, MAC address, MIN, ESN, Box ID, subscription channel ID, subscriber ID, or similar ID uniquely identifying the receiving devices and geographic position), and authorization and decode encryption keys.

The TSSD center 100 may then validate the entity's subscription fulfillment request and credentials received from the Internet cloud 116 or the cellular telephony cloud 118 via the connectivity medium 106. If the credentials are valid, the TSSD via the connectivity medium 102 may be returned to the portable display TSSD receiving devices, via the connectivity medium 102, through the Internet cloud 116 or the cellular telephony cloud 118. If the credentials are invalid, a rejection state may be transmitted to the portable display TSSD receiving devices, via the connectivity medium 106, through the Internet cloud 116 or the cellular telephony cloud 118.

The fixed placement display TSSD receiving devices 140 provide display locations which may include public place display screens 121, home entertainment appliance display screens 122, business display screens in a public place 124, business display screens on company property in public areas 126 such as a lobby, and business display screens on company property in private areas 128 such as an office or factory floor. The fixed placement display TSSD receiving devices 140 contain computer access devices and similar devices (software and hardware) which display entity functions available to the viewer, carry out communications functions, transmit and receive requests for authorization and TSSD and display messages or results of the requests. The computer access devices in the fixed placement display TSSD receiving devices 140 may include computers that run the single function access software 130, computers that run browsers linked into a TSSD display website 132, computers that run a TSSD tuner and display software 134, set top tuners for home entertainment appliances 136, stand alone tuners with web access 138, or other similar devices. The fixed placement display TSSD receiving devices 140 may link to the TSSD center 100 via communication systems which can include Wi-Fi link, cellular phone service, phone dial-up, radio frequency (RF), LAN, broadband link, satellite, or similar methods.

The fixed placement display TSSD receiving devices 140 may transmit authentication information to the TSSD center 100, via the connectivity medium 106, to the Internet cloud 116 or a TV/Radio Broadcast cloud 120. The information may contain a subscription fulfillment request and credentials, which may include identification and location information (some or all of the following: IP address, MAC address, MIN, ESN, Box ID, subscription channel ID, subscriber ID, or similar ID uniquely identifying the receiving devices and geographic position), and authorization and decode encryption keys.

The TSSD center 100 may then validate the entity's subscription fulfillment request and credentials received from the Internet cloud network 116 or the TV/Radio Broadcast cloud 120 via the connectivity medium 106. If the credentials are valid, the TSSD may be returned to the receiving devices, via the connectivity medium 102, through the Internet cloud 116 or the TV/Radio Broadcast cloud 120. If the credentials are invalid, a rejection state may be transmitted to the fixed placement TSSD receiving devices 140, via the connectivity medium 106, through the Internet cloud 116 or the TV/Radio Broadcast cloud 120.

Figure 2:
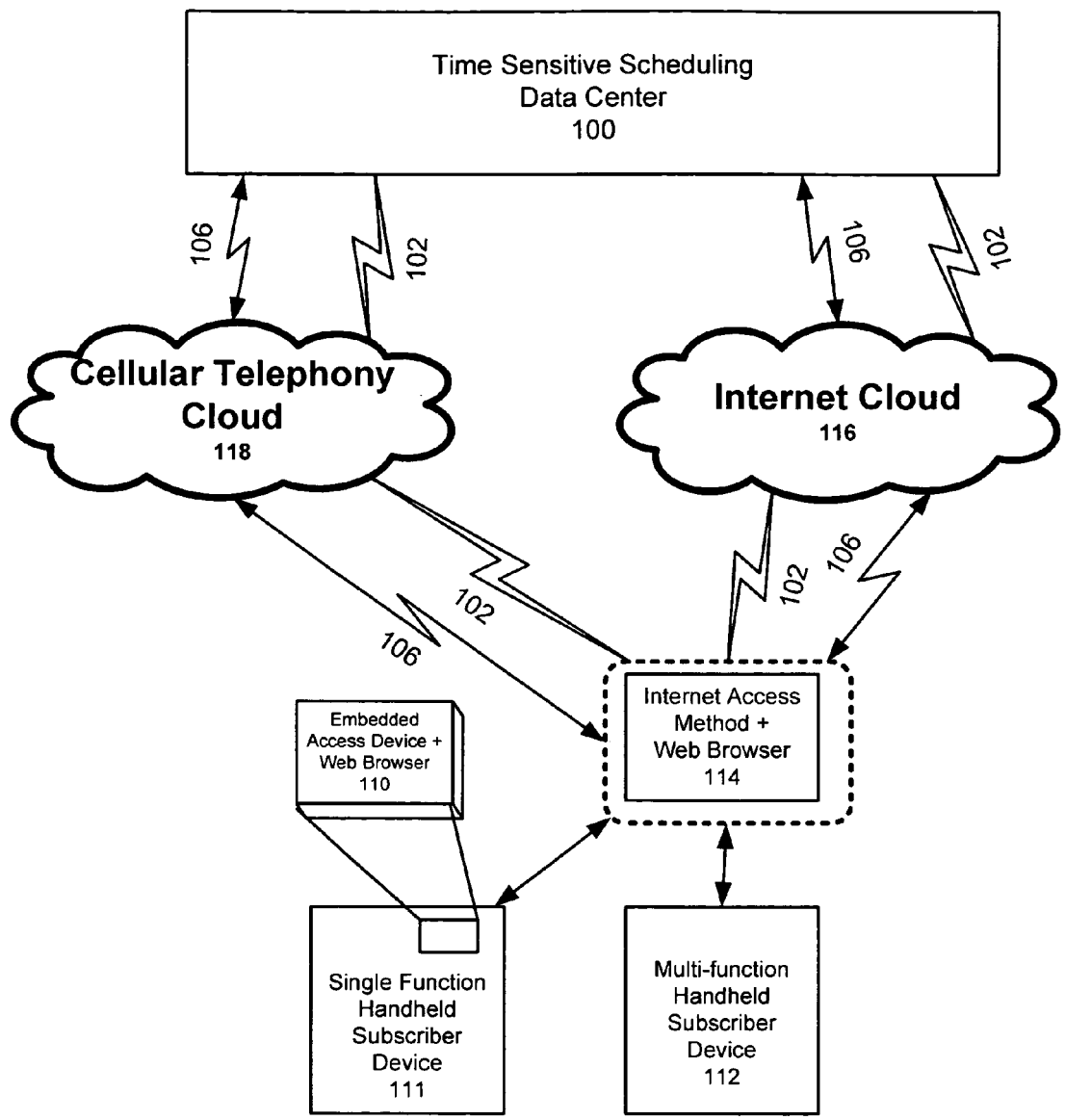
FIG. 2 is a representation of time sensitive scheduling data delivery network and device relationships according to one embodiment of the invention.

FIG. 2 is a representation of a communications network and device relationships configured in accordance with the principles of one embodiment of the invention relating to the portable display TSSD receiving devices. In the embodiment of FIG. 2, the entities may have access to TSSD streams wherever and whenever they have possession of subscriber devices 111, 112 which have connectivity to the TSSD center 100 via the Internet connectivity mediums 106 and 102, and have access via the Internet cloud 116 and/or the cellular telephony cloud 118. The portable display time sensitive scheduling data receiving devices may include a single function handheld device with embedded mechanisms for accessing the communications network and a multifunction handheld device which includes the ability to access the communications network as one of its functions.

Figure 3:
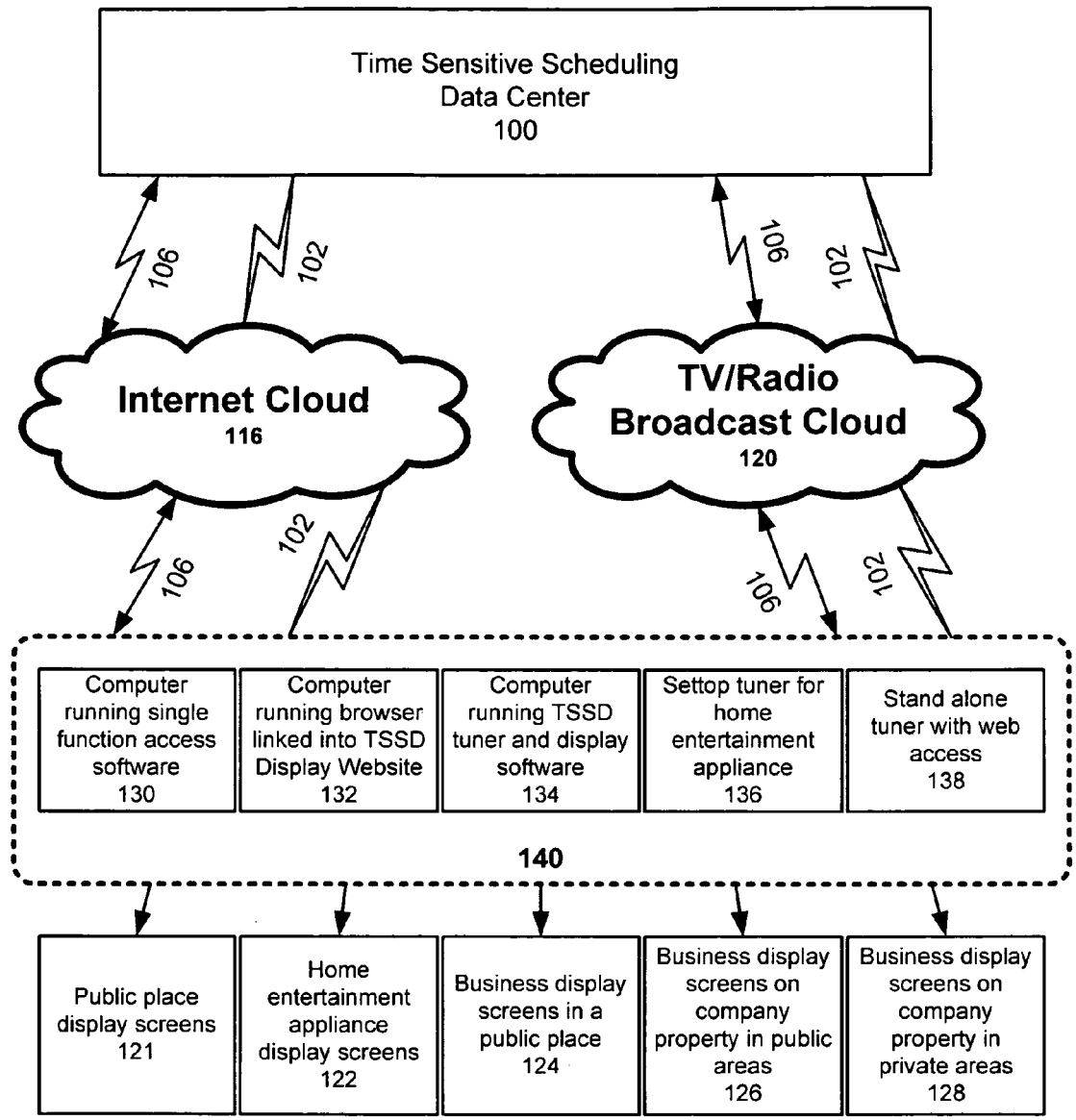
FIG. 3 is a representation of time sensitive scheduling data delivery network and device relationships according to one embodiment of the invention.

FIG. 3 is a representation of a communications network and device relationships configured in accordance with the principles of one embodiment of the invention relating to fixed placement display TSSD receiving devices 140. As shown in FIG. 3, fixed placement display receiving devices 140 may include any display screen fixed location such as public place display screens 121, home entertainment appliance display screens 122, business display screens in a public place 124, business display screens on company property in public areas 126, and business display screens on company property in private areas 128 in combination with any TSSD receiving mechanism such as computers that run the single function access software 130, computers that run browsers linked into a TSSD display website 132, computers that run a TSSD tuner and display software 134, set top tuners for home entertainment appliances 136, stand alone tuners with web access 138, or other similar devices. The fixed placement display TSSD receiving devices 140 may include a public cathode ray tube, liquid crystal display, or similar display device such as an electronic billboard, kiosk, or other large screen display.

The operation of one or more embodiments of the invention is shown with respect to FIGS. 4-1, 4-2, and 4-3. Briefly, the embodiments of FIGS. 4-1, 4-2, and 4-3 show a flowchart of a fulfillment process 400 for controlling how TSSD may be delivered to TSSD receiving devices. In these embodiments, process 400 controls how time sensitive scheduling data may be delivered to time sensitive scheduling data receiving devices and web browsers.

In these embodiments the fulfillment process 400 controls how data is streamed out to TSSD receiving devices; websites, communications sites, and the TSSD system servers. The actions in the fulfillment process include: 1) verify subscription status; 2) add subscription to profile; 3) remove subscription from profile; 4) limit subscription scope for data range, data type, and time period; 5) expand subscription scope for data range, data type, and time period; and 6) format, expand, and transmit TSSD packets.

In one embodiment of the fulfillment process 400, the request for TSSD may be initiated by an entity at an operation 402. The request for TSSD may be initiated from a non-web browser TSSD receiving device 408, a device equipped with hardware or software specifically designed to interface with the TSSD delivery network or a multi-function device with a web browser: a web browser device 410. At operation 402 the fulfillment process may transmit on line 403 a request ID, a subscriber ID, and a device type to an operation 404. At operation 404, the fulfillment process may authenticate a source of request which can be from various multi-platform, multi-communications TSSD receiving devices or web browsers. These TSSD receiving devices may include simple devices, advanced devices, embedded systems devices, individual access devices (e.g., cellular phones, PDAs), and community access devices (e.g., set tops equipped with input devices, kiosks) or these web browsers may be included in PDAs, PCs, cellular phones, tablet PCs. On line 405 the fulfillment process may maintain constant communication between operation 404 and an authentication process database 406. At the same time the fulfillment process at operation 404 may send out on line 407 the request ID to a non-web browser TSSD receiving device 408. The non-web browser TSSD receiving device 408 may respond by transmitting on line 409 the subscriber ID, the request ID, a device type, a device ID, and time frame for the non-web browser TSSD receiving device 408 for a particular time zone to operation 404 to confirm the source of the initiating request. The non-web browser TSSD receiving device 408 also may respond by transmitting on line 411 the subscriber ID, the device type, a device ID, and time frame for the particular time zone to operation 402. Also the web browser device 410 may respond by transmitting on line 413 the subscriber ID, the device type, and time frame for the particular time period to operation 402. Simultaneously, the fulfillment process at operation 404 may transmit on line 415 the request ID and an authentication key may be sent out with the subscriber ID and the device type to an operation 412. At operation 412, the fulfillment process may then verify and validate the subscriber ID. On line 417, the fulfillment process may maintain constant communication between operation 412 and a subscriber database 414. Next the fulfillment process at operation 412 may transmit on line 419 the request ID, subscriber ID, and authentication key to an operation 416. At operation 416, the fulfillment process may retrieve a subscriber's profile. On line 421, the fulfillment process may maintain constant communication between operation 416 and a subscriber profile database 418.

According to another embodiment, at a decision operation 420, the fulfillment process may determine whether the subscriber's profile is on file. If at decision operation 420, the fulfillment process determines the subscriber's profile is on file, the fulfillment process on line 457 may retrieve an entity's subscriptions at an operation 422. At operation 422, the fulfillment process may transmit on line 423 a subscription list to an operation 424. At operation 424, the fulfillment process may then verify the entity's subscription is still valid by checking for entity permission for each subscription, and verifying that the target or company is still accepting subscriptions. The fulfillment process at operation 424 may transmit on line 425 a valid subscription list to an operation 426. At operation 426, the fulfillment process may request TSSD using a valid subscription list. The fulfillment process may maintain constant communication between operation 426 and a TSSD retrieval process 428 by transmitting on line 427 a TSSD request to the process 428, and on line 429 from the process 428, TSSD, packets of events, meetings, and volunteer opportunities.

If at decision operation 420, the fulfillment process determines the subscriber's profile is not on file, the fulfillment process may enter a subscriber enrollment mode on line 459, and at an operation 430 may request a subscriber profile and subscription selections for the entity on line 465. In response to the request, the fulfillment process at an operation 432 may initiate enrollment and may transmit on line 431 a subscriber enrollment profile and subscription options list to operation 430. Next the fulfillment process at operation 430 may transmit the subscription options list on line 433 to the non-web browser TSSD receiving device 408, or on line 435 to the web browser This TSSD device may transmit on line 437 the subscription list request and enrollment profile to the enrollment operation 432 for validation. The web browser device 410 may transmit on line 439 the subscription list request and enrollment profile to the enrollment operation 432 for validation. The enrollment operation 432 may transmit approval notices and process completion status to the non-web browser TSSD device 408 on line 464. The enrollment operation 432 may transmit enrollment approval notices and enrollment process completion status to the web browser device 410 on line 445. The fulfillment operation 432 may transmit on line 441 a subscriber ID and a subscription ID to an operation 434. At operation 434, the fulfillment process may build and update entity subscription profiles. The fulfillment process at operation 434 may transmit on line 443 a completion status to operation 432. At operation 432, the fulfillment process may transmit on line 445 the completion status and approval notice (s) to the web browser device 410. At operation 432, the fulfillment process may transmit on line 464 the received build and update entity subscription profile completion status and the build and update entity subscription profile approval notice(s) to the non-web browser TSSD receiving device 408.

Returning to fulfillment mode, the fulfillment process operation 434 may transmit on line 447 a valid subscription list to operation 426. At operation 426, the fulfillment process may request TSSD based on the subscription list and subscriber profile. The fulfillment process at operation 426 may maintain communication on line 427 with the TSSD retrieval process 428. The TSSD retrieval process 428 may return matching TSSD (e.g., events, meetings, volunteer opportunities, due dates) online 429 to the TSSD requesting process 426. The requesting process 426 may transmit the TSSD received from operation 428 on line 449 to an operation 436. At operation 436, the fulfillment process may format TSSD response packets according to the privacy policy for the subscriber. The fulfillment process at operation 436 may transmit on line 451 an authentication key and the TSSD packets formatted to a decision operation 438.

At decision operation 438, the fulfillment process may determine whether the formatted TSSD response packets are being sent to a non-web browser TSSD receiving device 408 or web browser device 410. If at decision operation 438, the fulfillment process determines the TSSD packets are sent to the non-web browser TSSD receiving device 408, the fulfillment process on line 461 may export and transmit the TSSD packets to an operation 440. At operation 440 the TSSD packet may be formatted for the non-web browser TSSD receiving device 408 and transmitted on line 453 to the non-web browser TSSD receiving device 408. If at decision operation 438, the fulfillment process determines the formatted packets are not being sent to a non-web browser TSSD receiving device 408, the fulfillment process on line 463 may export and transmit the formatted packets to an operation 442. At operation 442, the TSSD packet may be formatted for the web browser device 410 and transmitted on line 455 to the web browser device 410.

Figures 1, 4:
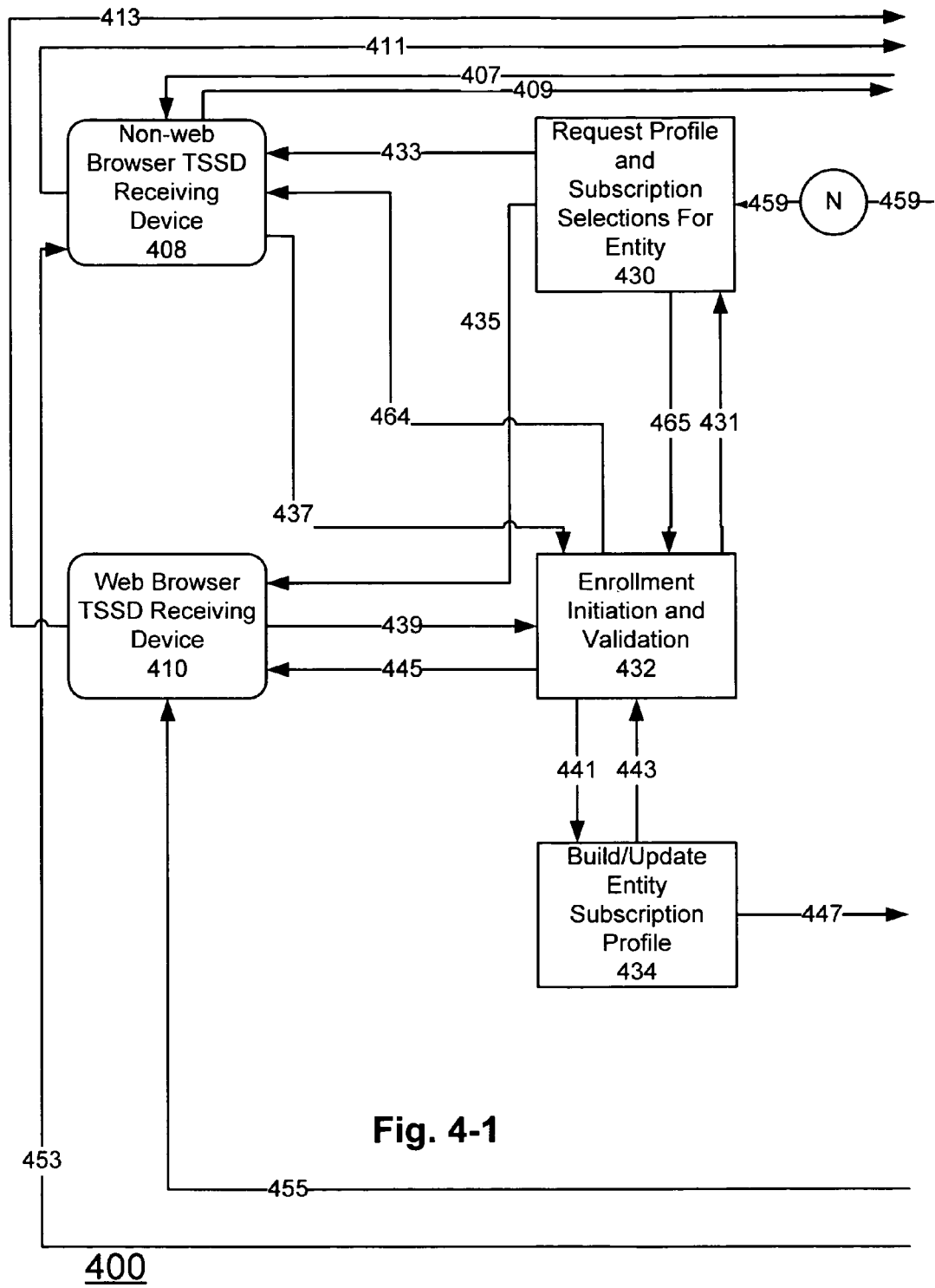
Figures 2, 4:
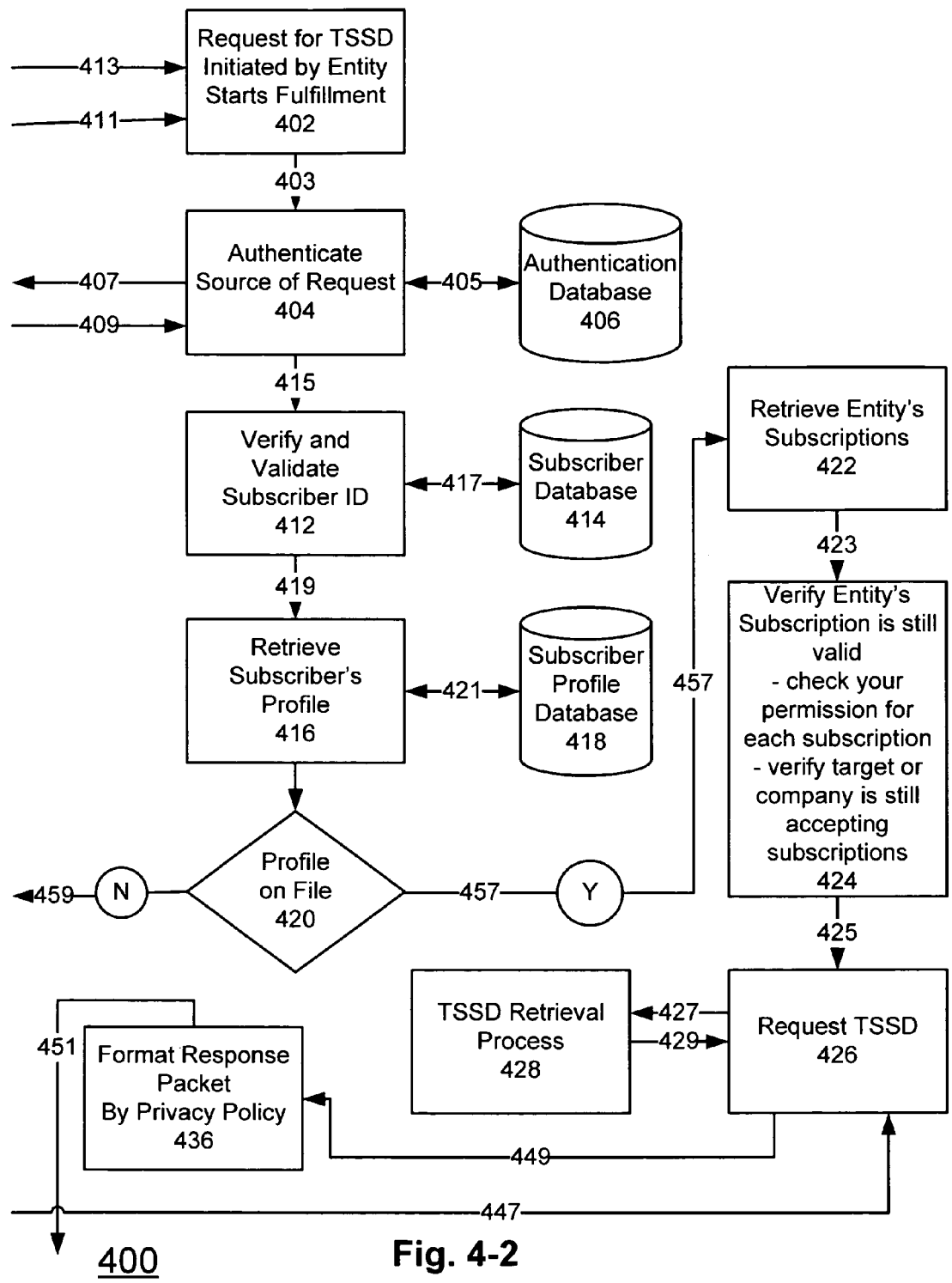
Figures 3, 4:
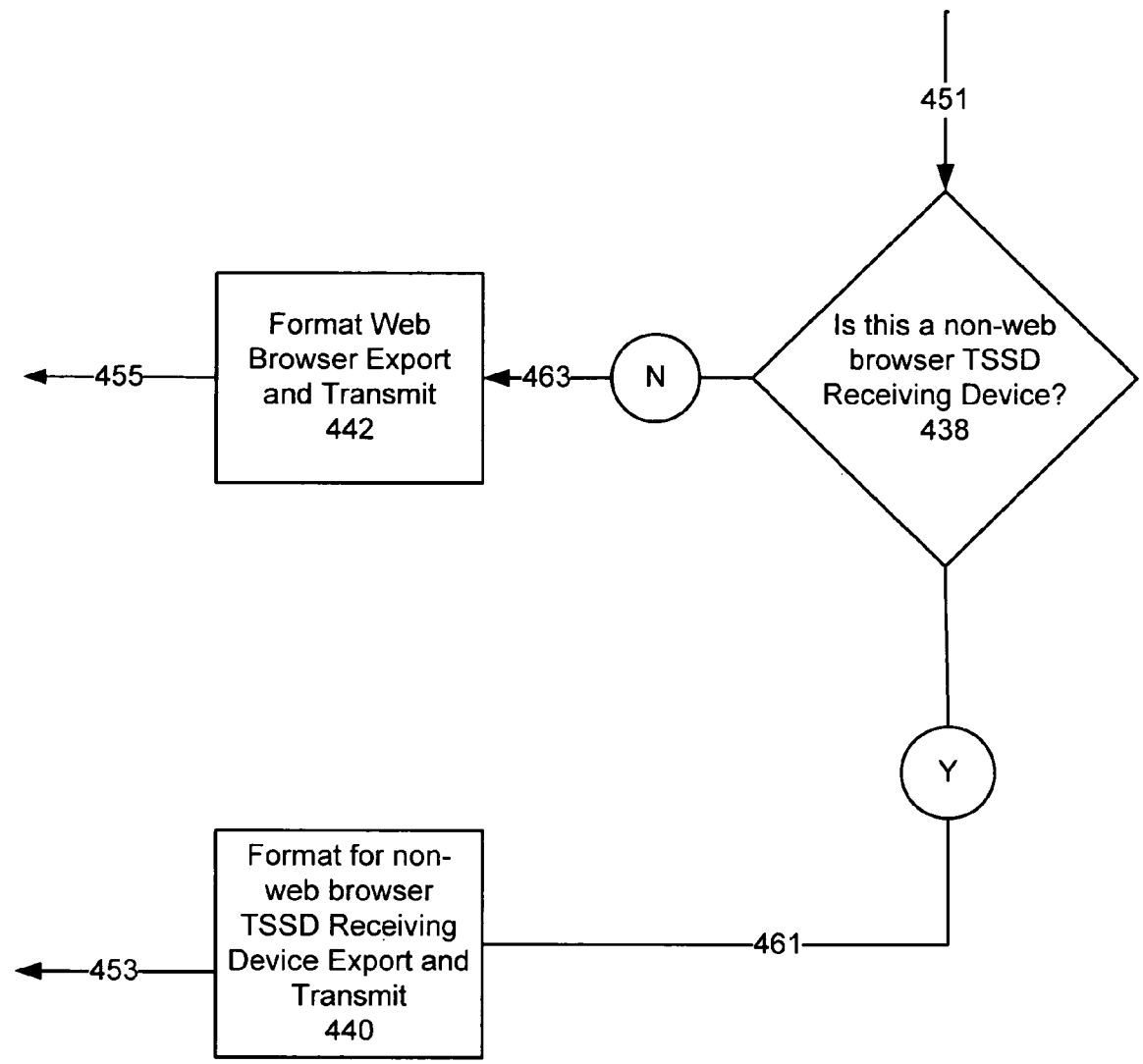
Figures 1, 5:
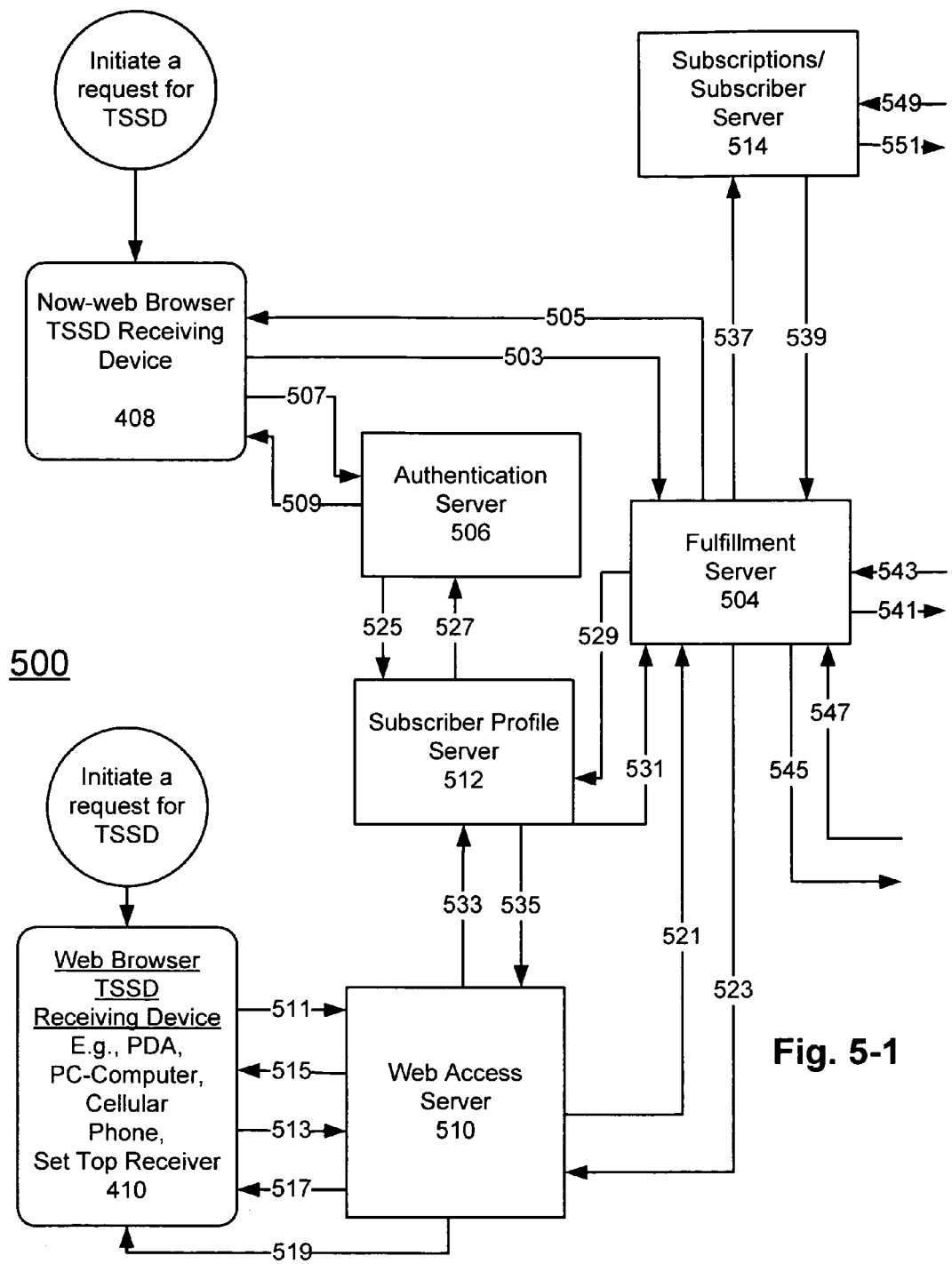
Figures 2, 5:
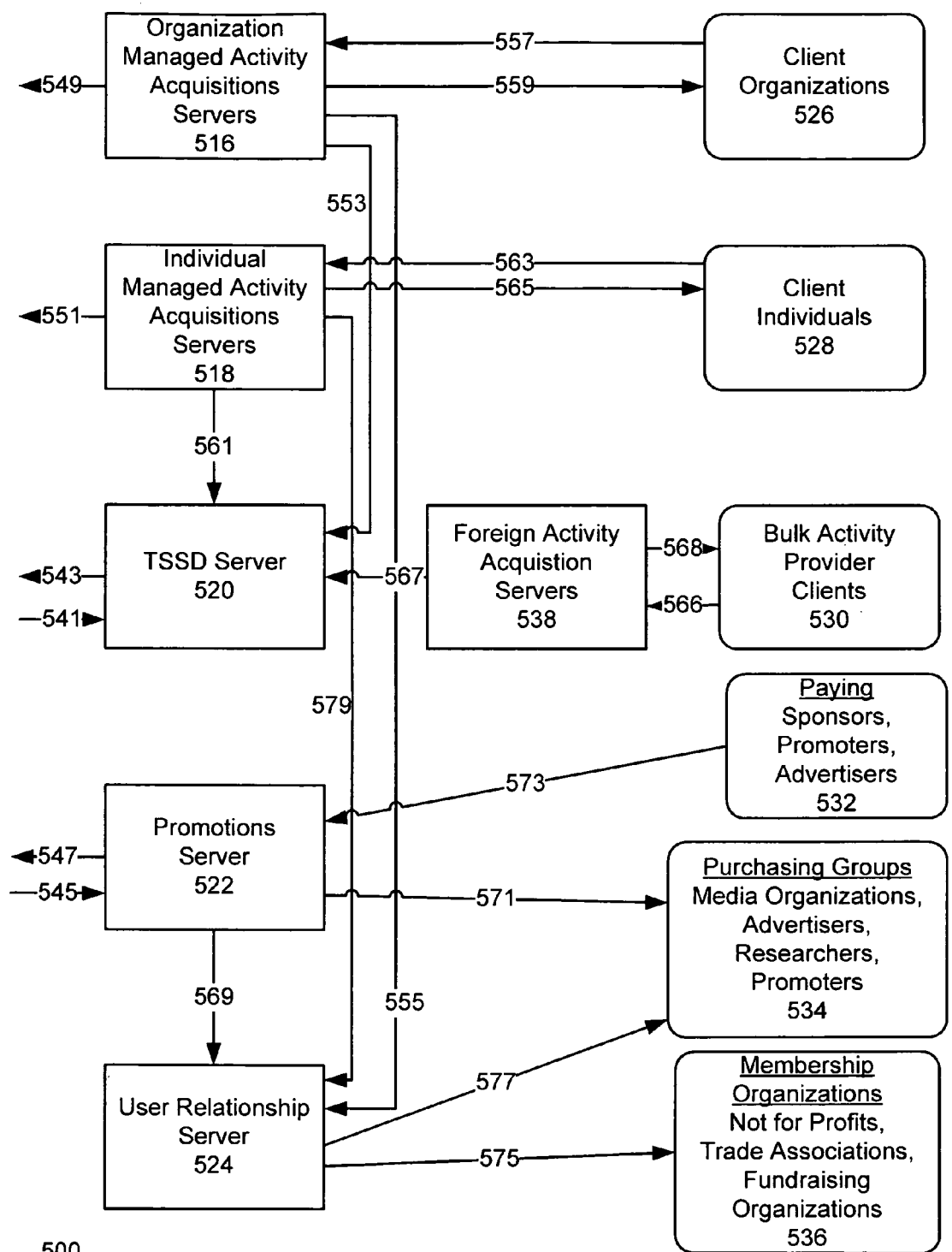

The operation of one or more embodiments of the invention is shown with respect to FIGS. 5-1 and 5-2 (a functional data distribution and services overview). Briefly, the embodiments of FIGS. 5-1 and 5-2 show a flowchart of a server system 500 for controlling how TSSD may be captured, stored, extracted and delivered to TSSD receiving devices and web browser devices. In these embodiments, the fulfillment server 504 is the hub of the server system and marks the boundary between the primary TSSD acquisition functions and the TSSD delivery functions.

According to one embodiment, the TSSD delivery network may be typically entered by an entity initiated request for TSSD using various multi-platform, multi-communications TSSD receiving devices and web browser devices or by a TSSD providing entity (client) initiating a request to post time sensitive scheduling data or related entity collateral material using web browser devices. These TSSD receiving devices may include simple communications devices (single function), advanced communications devices (multi-function), embedded communications systems devices, individual access devices (e.g., cellular phones, PDAs), and community access devices (e.g., set tops devices equipped with input devices or kiosks). The web browser devices may include Personal Digital Assistant, personal computers, computer workstations, laptop computers, tablet PCs, data servers, multi-function cellular phones, and text messaging devices. In addition to their primary function, all servers used in this embodiment of the invention may perform the necessary electronic communications functions and communications protocol management functions as needed to communicate with the other servers, TSSD receiving devices and web browser devices.

According to another embodiment, an entity of the TSSD delivery network may interface with the network by one of two basic methods: utilizing a non-web browser TSSD receiving device 408 or utilizing a web browser on a multi-function device capable of providing communications services and internet access web browser device 410.

In one embodiment, the web browser device 410 may transmit entity identification data on line 511 for authentication purposes to the web access server 510 if the entity has not been authenticated for this work session. The web access server may forward this information on line 533 to the subscriber profile server 512 for authentication purposes. The web access server 510 may transmit on line 515 an access denied status if the entity is not authenticated or security key if the entity is authenticated. To initiate a TSSD delivery network session for an authenticated entity, the web browser device 410 may transmit the security key and subscriber ID on line 513 to web access browser 510 which the web access servers may then validate against its managed list of authenticated entities. If the security key and subscriber ID are valid, the web access server 510 may transmit on line 517 an authentication key and a profile key. If the security key and subscriber ID are not valid, the web access server may transmit on line 517 a denied status. The web browser device 410 at the entity's initiation may retransmit a security key and subscriber ID if necessary. If the entity is authenticated and validated, then the web browser device 410 may receive TSSD data on line 519 from the web access server 510. An authenticated and validated entity may also transmit on line 513 a request for a subscriber profile change in the form of a request to add or delete subscriptions for TSSD data and then may receive on line 517 results of the profile change request.

In one embodiment, the non-web browser TSSD receiving device 408 may transmit entity identification data (embedded subscriber ID, device identifier, and device type identifier) on line 507 for authentication purposes to the authentication server 506 if the entity has not been authenticated for this work session. The authentication server 506 may transmit on line 509 an access denied status if the entity is not authenticated or a security key if the entity is authenticated. To initiate a TSSD delivery network session for an authenticated entity, the non-web browser TSSD receiving device 408 may transmit the authentication key and profile key on line 503 to fulfillment server 504 which the fulfillment server may then validate against its managed list of authenticated entities. If the entity is authenticated and validated, then the non-web browser TSSD receiving device 408 may receive TSSD data on line 505 from the fulfillment server 504.

In one embodiment, the fulfillment server 504 has the function of delivering TSSD and business policy determined collateral content to the requesting entity based on applying rules of the TSSD delivery business process according to the entity's affiliations and profile. In another embodiment, the fulfillment server 504 may examine content requests, may initiate the necessary requests for data from other servers (510, 512, 514, 520, 522) functioning in the TSSD delivery network, may transmit aggregated TSSD, promotional content, authentication keys, profile keys and may request state information to the non-web browser TSSD receiving device 408 or web access server 510 handling web browser device 410 TSSD requests, Additional functions of the fulfillment server 504 may include transmitting a subscriptions list, subscription keys, subscription status, authentication key, profile key, aggregated activity TSSD, promotion TSSD, request IDs, usage statistics, and profile descriptors to other servers (510, 512, 514, 520, 522). The TSSD acquisition functions of fulfillment server 504 will be covered later.

One method to start the TSSD delivery network system may be for a non-web browser TSSD receiving device 408 to transmit on line 503 an authentication key and a profile key to a fulfillment server 504. In response to the non-web browser TSSD receiving device 408, the fulfillment server 504 may transmit on line 505 to the non-web browser TSSD receiving device 408 the aggregated TSSD and promotion TSSD.

In certain embodiments, the authentication server 506 may have as its primary function the recognition of valid TSSD delivery network entities and the issuing of authentication keys to valid TSSD delivery network entities independent of the method the entity employs to access the TSSD delivery network to receive the TSSD data stream. The authentication server 506 may act as a gatekeeper for the TSSD delivery network by verifying an entity's authorization to use the TSSD delivery network, generating and distributing an authentication key for this entity's session based on business policies, maintaining a database of valid authentication keys and notifying the subscriber profile server 512, web access server 510 and non-web browser TSSD receiving device 408 when authentication has failed and/or authorization to use the network has been denied. The authentication server 506 also may provide necessary electronic communications functions and protocol management functions to facilitate communications between itself and non-web browser TSSD receiving devices 408 and between itself and the Subscriber Profile Server 512. The functions of the authentication server 506 may include maintaining the active list of subscriber IDs and authentication keys and forwarding on profile keys and profile key status from the Subscriber Profile Server 512 to authenticated non-web browser TSSD receiving devices 408. To initiate or reinitiate a TSSD delivery network session, the non-web browser TSSD receiving device 408 may transmit on line 507 a subscriber ID to an authentication server 506. In response to the non-web browser TSSD receiving device 408, the authentication server 506 either may transmit to the non-web browser TSSD receiving device 408 on line 509 a session authentication key and profile key or a status condition indicating that the device or subscriber has failed to authentication and access to the TSSD delivery network is denied.

According to another embodiment, the web access server 510 may control how data is received from and pushed out to the web browser devices 410. The functions of the web access server 510 may include processing login data, forwarding, managing and maintaining a database of security keys, supplying the security key for a TSSD delivery network session to the web browser devices 410, forwarding subscriber IDs to the subscriber profile server 512 to imitate a TSSD delivery network sessions, and packaging and forwarding authentication keys, profile keys, aggregated TSSD, and promotion TSSD to the web browser devices 410. A second way to start the server system 500 is a web browser device 410 may transmit on line 511 login data and on line 513 a security key and the subscriber ID to the web access server 510. In response to the web browser device 410, the web access server 510 may transmit on line 515 the security key, on line 517 the authentication key and profile key, and on line 519 the aggregated TSSD and the promotion TSSD. Also the web access server 510 may transmit on line 521 the authentication key and profile key to the fulfillment server 504. On line 523 the web access server 510 may receive the aggregated TSSD and the promotion TS SD.

According to another embodiment, the subscriber profile server 512 may have as its primary function the management and provision of subscription and subscriber profiles. A subscriber profile may provide attributes and preferences for a specific individual and a subscription profile may provide attributes and preferences for a specific subscription which may represent an individual, a specific subset of attributes of an individual (for example, a career view) or a composite of a group of individuals who share an access subscription. The subscription and subscriber profiles will hereinafter be referred to as the subscriber profile as their purpose and function are the same. The subscriber profile may control what and how TSSD data and TSSD promotion data coming from the fulfillment server 504 is pushed out to the non-web browser TSSD receiving device 408 and the web access server 510 for delivery to the web browser device 410.

The functions of the subscriber profile server 512 may include but are not limited to generating session subscriber profiles from subscription lists, tagging the subscriber profile for the current session with a profile key, and managing the index of profile keys and the subscriber's TSSD data security level for the currently active subscriber session. The subscriber profile server 512 may receive the subscriber ID on line 525 from the authentication server 506 and may transmit the profile key on 527 to the authentication server 506. The subscriber profile server 512 may receive the subscriber ID on line 533 from the web access server 510 and may transmit on line 535 the profile key to the web access server 510. The TSSD data security level identifier which is embedded in the subscriber key may be removed and maintained in an index. The subscriber profile server 512 may receive on line 529 a profile key from the fulfillment server 504, and may transmit on line 531 the subscriptions list and TSSD data security level identifier to the fulfillment server 504 to identify the TSSD content format, specific TSSD data stream and TSSD promotion data to serve to the non-web browser TSSD receiving device 408 and to the web access server 510 for delivery to the web browser device 410.

Up to this point the overview of the TSSD server system FIG. 5-1 describes how the fulfillment server 504, interacting with the authentication server 506, the subscriber profile server 512, and the web access server 510 may deliver TSSD to the non-web browser TSSD receiving devices 408 and web browser devices 410. The remaining process description FIG. 5-2 of the TSSD server system 500 shows how the fulfillment server 504; interacting with a subscriptions/subscriber server 514, TSSD server 520, promotions server 522, and user relationship server 524 may acquire the aggregated TSSD streams and TSSD promotional data to provide to the non-web browser TSSD receiving devices 408 and web browser devices 410. FIG. 5-2 also show how the TSSD server 520 may interact with the organization-managed activity acquisition server 516, individual-managed activity acquisition server 518 and the foreign activity acquisition server 538 to create TSSD data streams, and how the subscriptions/subscriber server 514 interacting with the organization-managed activity acquisition server 516 and individual-managed activity acquisition server 518 may generate subscription lists which determine the TSSD streams provided to the non-web browser TSSD receiving devices 408 and web browser devices 410.

The fulfillment server 504 may transmit a subscriptions status request list and subscriber key on line 537 to the subscriptions/subscriber server 514 and may receive the subscriber key and an updated subscription status list on line 539 from the subscriptions/subscriber server 514. On line 541 the fulfillment server 504 may transmit a subscriptions list and a request ID to the TSSD server 520 and may receive the request ID and the matching requested TSSD on line 543 from the TSSD server 520. The fulfillment server 504 may transmit subscriber profile descriptors, subscriber usage statistics, and a request ID on line 545 to the promotions server 522 and may receive the request ID and matching TSSD promotion data on line 547 from the promotions server 522. The fulfillment server 504 may format and aggregate these TSSD and TSSD promotional data segments into TSSD streams based on business policy rules, subscriber preferences (subscriber profiles) and timeframe relevancy requirements. The fulfillment server 504 then may transmit these streams to the non-web browser TSSD receiving devices 408 and web browser devices 410 as described above.

The subscriptions/subscriber server 514 may have as its primary function the management and provision of subscriber's subscription profiles. In one embodiment, the subscriptions/subscriber server 514 may be a repository of various subscription and subscriber information. The functions of the subscriptions/subscriber server 514 may include maintaining the subscription database, generating subscriber subscription list, matching subscriber key to active subscriber subscription list, and maintaining subscription status, subscriptions/subscriber pair index and subscriber profiles. The subscriptions/subscriber server 514 may receive subscriptions/subscriber pair data and subscriber profiles from the organization-managed activity acquisition servers 516 on line 549 and the individual-managed activity acquisition servers 518 on line 551 as they are generated, updated or terminated. The subscriptions/subscriber server 514 may receive a subscriptions status request list and subscriber key on line 537 from the fulfillment server 504 and in response may transmit on line 539 the updated subscription status list and subscriber key to the fulfillment server 504.

The organization-managed activity acquisition servers 516 may be dedicated to storing and providing access to a shared database of TSSD. The functions of the organization-managed activity acquisition servers 516 may include providing services to organizations 526 for controlling subscription/subscriber pairs, maintaining member and affiliate profiles (a default subscriber), collection and management of organization (client) specific TSSD (e.g., events, meetings, promotions, volunteer opportunities, and service activities), and maintaining individual linkage (affiliation) data. The organization-managed activity acquisition servers 516 may transmit TSSD updates on line 553 to the TSSD server 520 and subscription/subscriber pairs and subscriber profiles on line 549 to the subscriptions/subscriber server 514. The organization-managed activity acquisition servers 516 may transmit individual linkage data (e.g., affiliations and relationships to specific organizations) updates on line 555 to the user relationship server 524. The organization-managed activity acquisition servers 516 may receive on line 557 TSSD from client organizations 526. The organization-managed activity acquisition servers 516 may store and provide access to process status, data status, statistics and additional data (e.g., organization descriptions, product/service descriptions, news/publications, FAQs, resource links, organization members and affiliates and their profiles, contact information, skills and derived interests, and preferences). Process status, data status, statistics and Client specific TSSD on line 559 may be transmitted by organization-managed activity acquisition servers 516 to client organizations 526 (e.g., their members, affiliates, clients), and the general public.

The individual-managed activity acquisition servers 518 may be dedicated to storing and providing access to a shared database of TSSD. The functions of the individual-managed activity acquisition servers 518 may include collection and management of (non-client) organization TSSD, collection and management of client individuals 528 originated or specific TSSD and TSSD updates, and generation of statistics, process status and data status feedback for the originating client individuals 528. The individual-managed activity acquisition servers 518 may transmit on line 561 TSSD updates to the TSSD server 520. The individual-managed activity acquisition servers 518 may transmit on line 551 subscription/subscriber pairs and subscriber profiles to the subscriptions/subscriber server 514. The individual-managed activity acquisition servers 518 may receive on line 563 TSSD (e.g., events, meetings, promotions, and volunteer opportunities) from client individuals 528. The individual-managed activity acquisition servers 518 servers may store and provide access to additional data (e.g., organization profiles and individual client profiles: contact information, skills, derived interests, associates and their profiles). Client specific TSSD and statistics, process status and data status feedback for the originating client individuals 528 may be transmitted by individual-managed activity acquisition servers 518 on line 565 to client individuals 528. The individual-managed activity acquisition servers 518 may transmit on line 579 individual linkage data (e.g., affiliations and relationships to specific organizations) updates to the user relationship server 524.

The foreign activity acquisition servers 538 may be dedicated to storing and providing access to a shared database of TSSD. The functions of the foreign activity acquisition servers 538 may include collection and management of organization and individual specific TSSD not provided by the originating organizations and/or individuals, and the generation of statistics, process status and data status for the originating bulk activity provider clients 530. The foreign activity acquisition servers 538 may transmit on line 567 TSSD to the TSSD server 520. The foreign activity acquisition servers 538 may receive on line 566 TSSD from bulk activity provider clients 530. Statistics, process status and data status may be transmitted on line 568 by foreign activity acquisition servers 538 to bulk activity provider clients 530.

The TSSD server 520 may be dedicated to storing and providing access to a shared database of TSSD. The functions of the TSSD server 520 may include assimilating TSSD, fulfilling TSSD requests based on a subscriptions list, and processing TSSD updates. The TSSD server 520 may receive on line 541 the subscriptions list and request ID from the fulfillment server 504 and may transmit on line 543 the requested TSSD and the request ID to the fulfillment server 504. Also the TSSD server 520 may receive on line 553 TSSD updates from the organization-managed activity acquisition servers 516, may receive on line 561 TSSD updates from the individual-managed activity acquisition servers 518, and may receive on line 567 TSSD updates from the foreign activity acquisition servers 538.

From the foreign activity acquisition servers 538, these TSSD updates may include public service announcements, community service announcements donated by the company, automated web data mining result collections, and radio station, TV station, museum theatre, and performing arts venue program schedule submissions.

The promotion servers 522 may be dedicated to storing and providing access to promotion TSSD (specifications, promotional content and scheduling data) from paying sponsors, promoters, and advertisers 532, and can deliver them to TSSD delivery network entities via the fulfillment server 504. The functions of the promotions server 522 may include assimilating promotion TSSD, fulfilling requests for promotional content, and the generation of statistics, process status and data status for promotional content and TSSD.

The promotions server 522 may receive on line 573 promotion TSSD from sponsors, promoters, and advertisers 532. The promotions server 522 may receive on line 545 the profile descriptors, usage statistics, and request ID from the fulfillment server 504 and may transmit on line 547 the request ID and promotion TSSD to the fulfillment server 504. On line 569 the promotions server 522 may transmit the usage statistics to the user relationship server 524. On line 571 the promotions server 522 may transmit the usage statistics to purchasing groups 534 (e.g., media organizations, advertisers, researchers, and promoters).

The user relationship server 524 may be dedicated to storing usage statistics, behavioral data and individual linkage data updates. The functions of the user relationship server 524 may include assimilating usage statistics and behavioral data, administering individual linkage data, the generation of statistics, process status and data status for TSSD delivery network user linkage and behavioral data, and lead generation. Lead generation is the process of collecting behavior and preference information and identifying potential consumers. A lead generation system may provide a provider of goods or services with a stream of motivated potential consumers. The user relationship server 524 may receive on line 569 usage statistics from the promotions server 522, may receive on line 579 individual linkage data updates from the individual-managed activity acquisition servers 518, and may receive on line 555 individual linkage data updates from the organization-managed activity acquisition servers 516. The user relationship server 524 on line 575 may transmit linkage data and lead generation results to membership organization clients 536 (e.g., trade associations, chambers of commerce, not for profits and fundraising organizations) and on line 577 may transmit behavioral, and usage statistics to media services purchasing and study groups 534 (e.g., media organizations, advertisers, researchers and promoters).

FIG. 6 is a class diagram illustrating classes of TSSD Activity Sources 602 according to one embodiment of the invention. In the class diagram are described classes of TSSD Activity Sources 602. These classes of TSSD Activity Sources 602 may include Standard Events 604, Standard Meetings 606, Ad Hoc Activities 608, and Observances 610. The term gathering as used herein should be considered in a metaphorical context and is not intended to indicate only geographic presence or proximity. For example, in celebrating holidays or life events (e.g., birthdays or wedding anniversaries), a number: of people may give credence or significance to a period or point in time, but may not necessarily gather together in the same geographic space.

Standard Events 604 may relate to routine and non-routine gatherings of the same or ad hoc groups of individuals in association for purposes other than conducting the regular business of the associations. Standard Events 604 may include speaker series, educational conferences, symposiums, concert series, church services, and family reunions.

Standard Meetings 606 may relate to generally recurring gatherings of the same individuals for the purpose of conducting the business of the association. Standard Meetings 606 may include board meetings, committee meetings, annual membership meeting, study group meeting, delegate conventions, and educational classes.

Ad Hoc Activities 608 may encompass all other pre-announced gatherings of individuals for social purposes. Ad Hoc Activities 608 may include ad hoc associations, one-time occurrence gatherings, social parties, social dates, special purpose/ad hoc meeting, non-series concerts, weddings, dinner parties and logistical events such as the delivery of materials, displays of some content or an appointment to receive services.

Observances 610 may include routine recognition of a holiday or special activity date such as Election Day or tax due date and ad hoc life events such as a birth or a marriage. Observances 610 may be mass recognitions of an ad hoc event or may be ad hoc or routine gatherings of the same or ad hoc groups of individuals in association for purposes of commemorating an event or occurrence.

Figure 7:
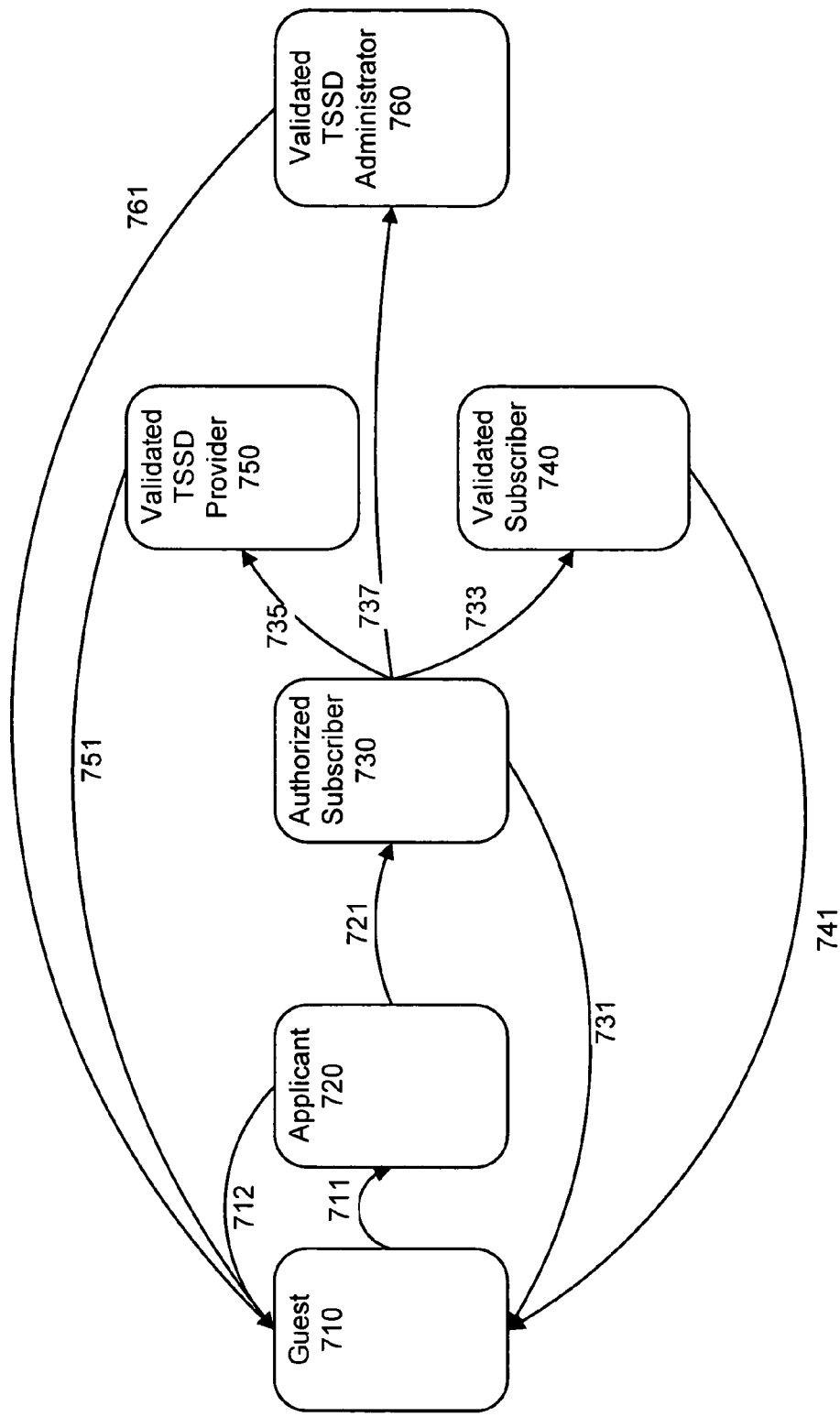
FIG. 7 illustrates states associated with an entity and actions that can cause a transition between the states according to one embodiment of the invention.

FIG. 7 is a state diagram illustrating the states associated with an entity and processes that can cause a transition between the states according to one embodiment of the invention. The term entity in this context may be a person or device interfacing with an embodiment of the invention. In an embodiment, a real-time state exists in which an entity may initiate a session as a guest, as an: applicant, or as an authorized subscriber. Once an entity's credentials may have been validated as previously described by the authentication server 506 or the web-access server 510, the entity's status can be upgraded to validated subscriber, validated TSSD provider, or validated TSSD administrator. An entity who submits no credentials may remain in a guest state 710. An entity whose credentials fail may be placed in the guest state 710.

In the guest state 710, an entity may view TSSD data and may request TSSD data intended for viewing by the general public. The entity may obtain a more privileged state for interacting with an embodiment of the invention by applying for an authorized subscriber state 730. An entity that may enroll on line 711 for a more privileged state is deemed in an applicant state 720. In the applicant state 720 if enrollment identification information and qualification information submitted is deemed to fail the qualification requirements for higher status, on line 712 the entity may be returned to the guest state 710. In the applicant state 720 if enrollment identification information and qualification information submitted is accepted, on line 721 the entity may be transitioned to the authorized subscriber state 730.

In the authorized subscriber state 730, an entity may provide identification credentials which if accepted allow the entity to transition on line 733 to a validated subscriber state 740, on line 735 to a validated TSSD provider state 750 or on line 737 to a validated TSSD administrator state 760, If an entity who qualified for the authorized subscriber state 730 no longer qualifies for that state, that entity returns to the guest state 710 on line 731.

In the validated subscriber state 740, the entity may view public TSSD data and restricted subscription data, may subscribe to receive restricted TSSD data, and may unsubscribe to receiving restricted data. If an entity, who qualified for the authorized subscriber state 730 and provides identification credentials for the validated subscriber state 740, no longer qualifies for the authorized subscriber state 730, that entity returns to the guest state 710 on line 741.

In the validated TSSD provider state 750, the entity may view public TSSD data and restricted subscription data, may subscribe to receive restricted TSSD data, may unsubscribe to receiving restricted data, and may submit TSSD data to the organization-managed activity acquisition server 516, the individual-managed activity acquisition server 518, or the TSSD server 520. If an entity who qualified for authorized subscriber's state 730 and provides identification credentials for the validated TSSD provider state 750 no longer qualifies for the authorized subscriber state 730, that entity returns to the guest state 710 on line 151. If an entity who qualified for the authorized subscriber state 730 and provides identification credentials for the validated TSSD provider state 750 no longer qualifies for the validated TSSD provider state 750, that entity returns to the guest state 710 on line 751.

In the validated TSSD administrator state 760, the entity may view public TSSD data and restricted subscription data, may subscribe to receive restricted TSSD data, may unsubscribe to receiving restricted data, may authorize or deny access credentials, and may submit TSSD data to the organization-managed activity acquisition server 516, the individual-managed activity acquisition server 518, or the TSSD server 520. If an entity who qualified for the authorized subscriber state 730 and provides identification credentials for the validated TSSD administrator state 760 no longer qualifies for the authorized subscriber state 730, that entity returns to the guest state 710 on line 761. If an entity who qualified for the authorized subscriber state 730 and provides identification credentials for the validated TSSD administrator state 760 no longer qualifies for the validated TSSD administrator state 760, that entity returns to the guest state 710 on line 761.

Figure 8:
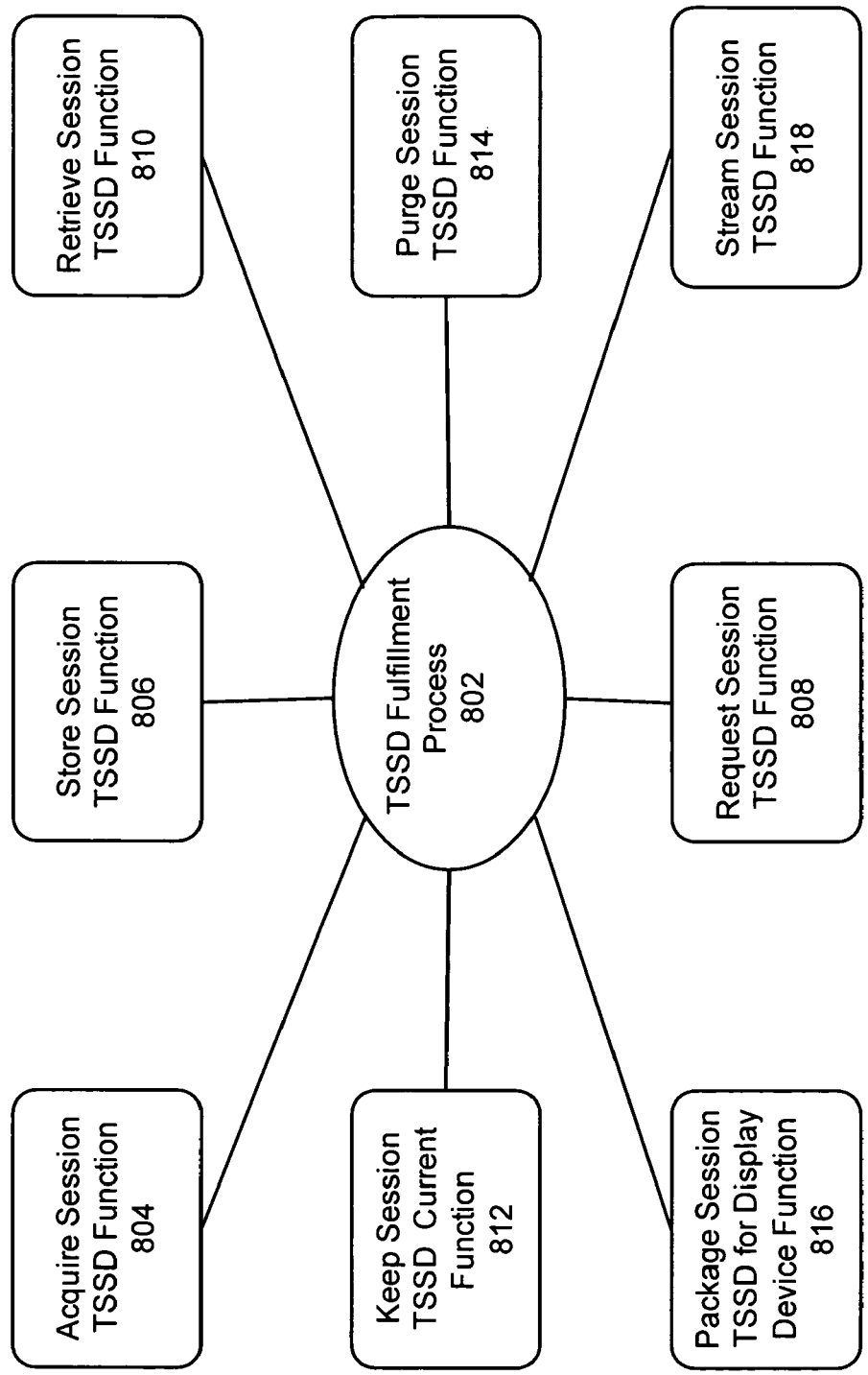
FIG. 8 shows primary activity functions of a time sensitive scheduling data fulfillment process according to one embodiment of the invention.

FIG. 8 shows an object diagram displaying the primary activity functions of the TSSD fulfillment process according to one embodiment of the invention. The TSSD Fulfillment Process 802 may be the central activity of the TSSD delivery network and may be coordinated by the fulfillment server 504 described earlier and depicted in FIG. 5.1. The primary activities embodied in the TSSD fulfillment process may be acquiring session TSSD 804, storing session TSSD 806, requesting session TSSD 808, retrieving session TSSD 810, keeping session TSSD current 812, purging session TSSD 814, packaging session TSSD for specific display devices on specific TSSD receiving devices 816 and streaming session TSSD 818 to receiving devices. Session TSSD is that TSSD flowing through the TSSD delivery network relevant to a specific entity during that entity's current network session. The session TSSD data stream may include announcements, schedules, events, meetings, activities of associations and affinity groups, and promotional content.

The TSSD fulfillment process 802 may gather all the necessary information and functions to build a TSSD data stream for an entity's current session. The acquire session TSSD function 804 may interrogate the entity's profiles and preferences then may determine what TSSD should be acquired to create the TSSD data stream for the entity's current session. The request session TSSD function 808 may prepare the appropriate network request objects for the retrieve session TSSD function 810 to obtain the TSSD for the entity's current session. The retrieve session TSSD function 810 may issue the necessary extraction requests across the TSSD delivery network to obtain the TSSD for the current session. The store session TSSD function 806 may aggregate and store the retrieved TSSD, TSSD extraction requests and entity preferences in preparation for transmitting the resulting TSSD data stream to the entity. The package session TSSD for display device function 816 may modify the TSSD data to accommodate display functionality requirements on the entity's receiving device. The stream session TSSD function 818 may assemble the TSSD stream for the entity's current session and may transmit the TSSD data stream. The keep session TSSD current function 812 may modify the TSSD extraction requests and preferences as necessary to maintain the currency of the TSSD data stream during the entity's current session. The purge session TSSD function 814 may remove TSSD from the data stream when it expires or no longer meets the preference requirements of the entity for the current session.

Various activity data collection mechanisms may enable TSSD fulfillment process 802 to create the TSSD data stream for an entity session. Activity data collection mechanisms may include various multi-platform, multi-communications TSSD receiving devices or web browsers. These TSSD receiving devices may include simple devices, advanced devices, embedded systems devices, individual access devices (e.g., cellular phones, PDAs), and community access devices (e.g., set tops equipped with input devices, kiosks) or these web browsers may include PDAs, PCs, cellular phones, tablet PCs. Other data collection mechanisms may include call centers that provide direct contact information transfers and bulk purchase of activity data from vendors.

In one embodiment, the stream session TSSD function 818 may assemble a data stream containing one or more profiled and prioritized feed packets of content known as a channel. The channel may now be ready to be transmitted to windows in display devices. The display devices may be portable or fixed placement. The portable display devices may include mobile computing devices, PDAs, cellular phones, personal computers, workstations, and a combination thereof. The fixed placement display devices may include public place business display screens, home entertainment appliance displays, business display screens in a public place, business display screens on company property in public areas, and business display screens on company property in private areas and a combination thereof.

FIG. 9 is a class diagram of primary sources viz., TSSD data feeds for a TSSD acquisition process 902 from a business process view point according to one embodiment of the invention. The TSSD acquisition process 902 may acquire most of the TSSD used in the TSSD delivery network from TSSD providing entities via these feeds. A data feed in this context is a random stream of TSSD added to the TSSD delivery network by TSSD providing entities. The TSSD may be event, meeting, observance or activity schedule data and descriptions submitted by entities. The primary classes of data feeds may include product client data feeds 904, embedded data feeds 906, purchased and bartered TSSD data feeds 908, research team scans data feeds 910 and call center survey data feeds 912.

A product client data feed 904 may be a data feed from which the TSSD acquisition process 902 acquires TSSD from provider products. The data feed from provider products may be characterized by those applications and activities that produce activity coordination data streams as a by-product of use. These provider products may be for those organizations and individuals that can understand the benefits of activity communications tools. Those clients and activities that benefit from such provider products may include organizations, special events, family reunions, government agencies, and associations such as homeowner's associations.

Embedded data feeds 906 may be data feeds from which the TSSD acquisition process 902 may acquire the data feeds from embedded TSSD feed modules in foreign organization's software applications, tools and websites. These embedded data feeds may involve foreign organizations who integrate TSSD feed modules within their products. Examples of such organizations may include professional service organizations in the health care, restaurant, and local sports management activity areas. Other examples may include retail business organizations and boutique businesses.

Purchased and bartered TSSD data feeds 908 may be data feeds from which the TSSD acquisition process 902 may acquire the data feeds by purchasing and bartering data feeds from businesses, associations, and individuals. These data feeds may connect to the TSSD delivery network via automated or manual mechanisms.

Research team scans data feeds 910 may be data feeds from which the TSSD acquisition process 902 may acquire the data feeds from research team efforts to scan private/public data sources (e.g., websites, association publications, and print media community calendars). These data feeds may connect to the TSSD delivery network via automated or manual mechanisms.

Call center survey data feeds 912 may be data feeds from which the TSSD acquisition process 902 may acquire the data feeds from call center (customer support staff) surveys of clients involving direct contact information transfers.

FIG. 10 is an objects diagram illustrating basic attributes of TSSD 1002 according to an embodiment of the invention. In the objects diagram may be defined sets of TSSD attributes 1002. These TSSD attributes 1002 can include: Start Time/End Time 1004; Start Date/End Date 1006; Name/Title 1008; Source/Owner 1010; Target Audience 1012; Display Parameters 1014 which may include graphics, logos, captions, and colors; Visibility Parameters 1016 (e.g., posting date, hide flag); Administration Parameters 1018 (e.g., who created, when created); Description of Activity 1020; Host of Activity 1022; and Location 1024.

Figure 11A:
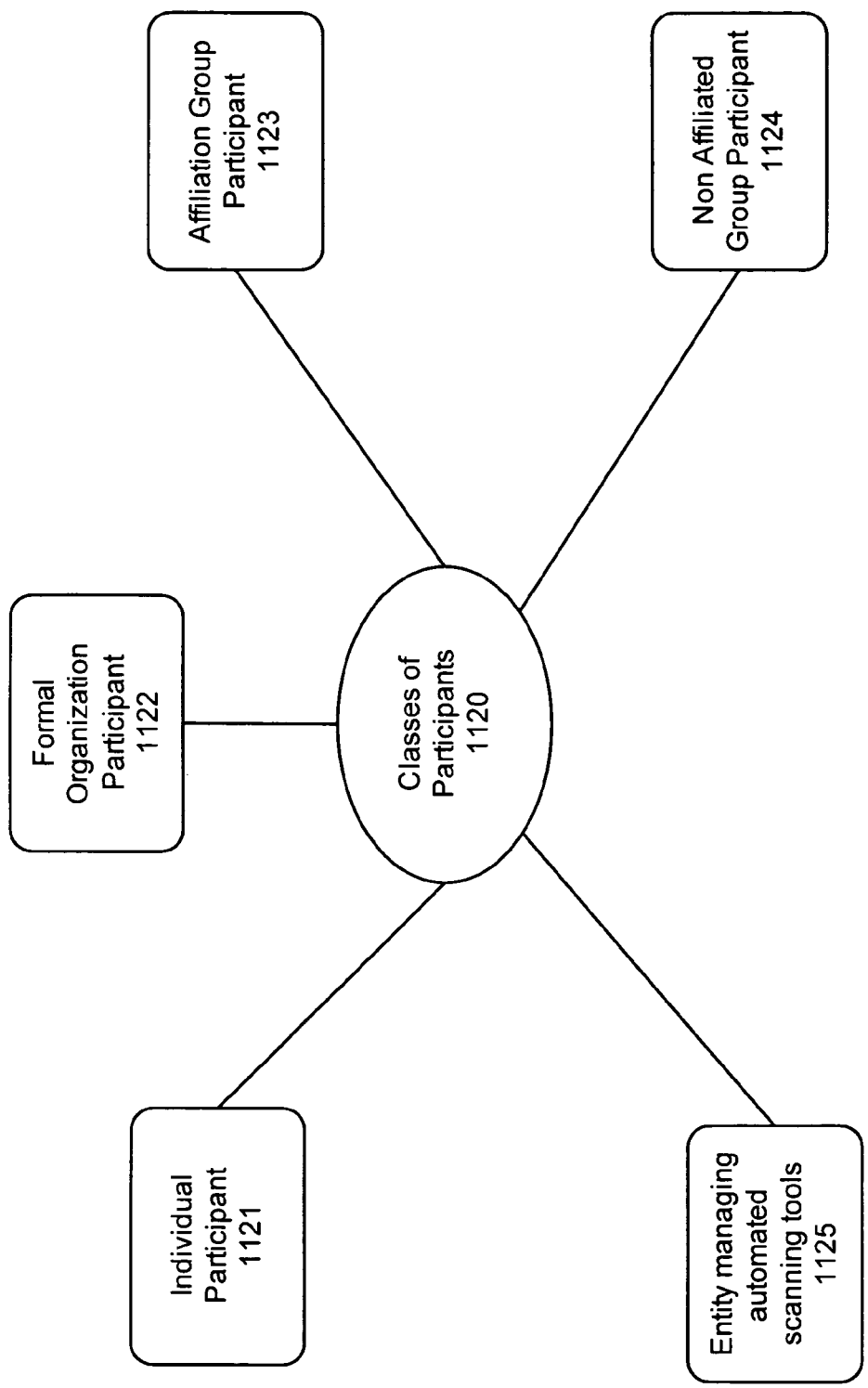
FIGS. 11A-C are class diagrams illustrating entities of time sensitive scheduling data according to one or more embodiments of the invention.

FIG. 11A is a class diagram illustrating entities that comprise classes of participants 1120 according to at least one embodiment of the invention. These classes of participants 1120 may fall into one or both of the categories of providers of TSSD or consumers of TSSD (target audiences in FIG. 11B). In the FIG. 11A class diagram are described the participants. An individual participant 1121 may be any person acting in their own interest, for example. A formal organization participant 1122 may be an organization which is certified by any authority generally recognized as a governing body and which may have a formalized membership structure. Examples of formal organizations range from companies with staff to trade associations like the American Bar Association to little league teams. An affiliation group participant 1123 may be an informal association of individuals which has a loose membership structure or simple affiliation mechanism. Examples of affiliated groups may include fan clubs, pickup teams, typical internet social networks and groups of school friends. A non-affiliated group participant 1124 may be a group of individuals that share common characteristics but are not directly associated with each other. Examples of non-affiliated group participants may be passengers in an airport terminal, fans attending a sports event or concert and adults age 26-35. An entity managing automated scanning tools 1125 may be an individual or an organization which is utilizing automated computer software to harvest data posted on the internet. Examples of an entity managing automated scanning tools may be search-engine companies and price comparison companies.

Figure 11B:
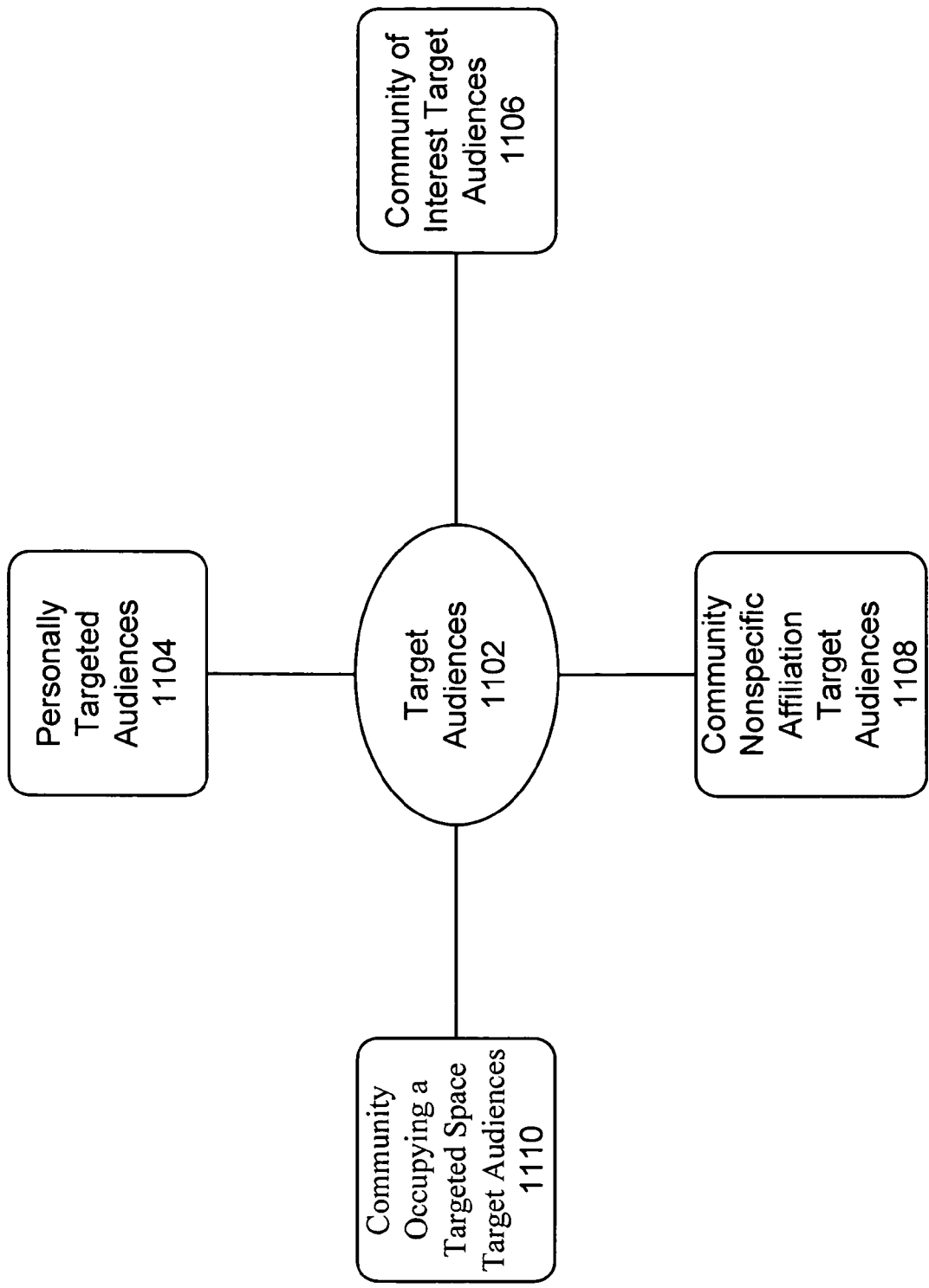
Figure 11C:
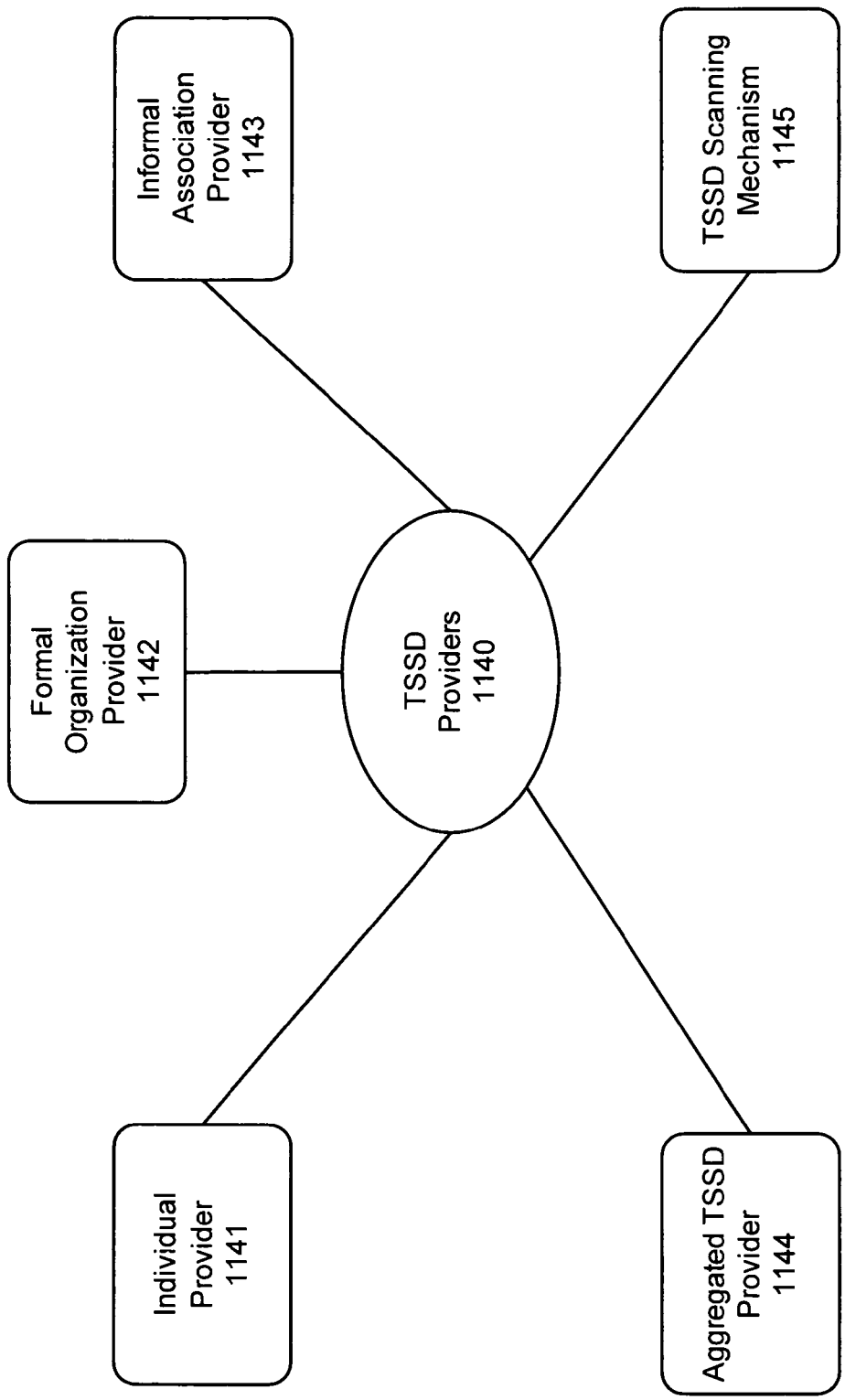

FIG. 11B is a class diagram illustrating target audiences according to an embodiment of the invention. In the FIG. 11B class diagram are displayed the primary audience classes of Target Audiences 1102.

In one embodiment, Personally Targeted Audiences 1104 may be individuals to whom specific TSSD and promotional material are streamed based on the attributes and preferences explicit in their personal profile in the TSSD delivery network. Personally Targeted Audiences 1104 may include audiences targeted by self-chosen membership or direct affiliation with a TSSD delivery network product client. Examples of Personally Targeted Audiences 1104 may include active members of a service or social club, lapsed members of a trade association, board members of a not-for-profit organization, board members, staff or clients of a business, and individual subscribers to the TSSD delivery network services.

Community of Interest Target Audiences 1106 may correspond to audiences who share identified common affiliations deemed significant for this invention and to whom specific TSSD and promotion materials are streamed based on their affiliations, the common attributes derived for the community group, and the specific preferences of significant members of the community group. Community of Interest Target Audiences 1106 may include dentist, alumni of a college, fans of an artist or genre of music, and wine lovers who prefer cabernet sauvignon.

In one embodiment, Community Nonspecific Affiliation Target Audiences 1108 may be audiences who share identified common attributes deemed significant for this invention and to whom specific TSSD and promotion materials are streamed based on the common attributes and affiliations derived for the community group, and the specific preferences of significant members of the community group. Community Nonspecific Affiliation Target Audiences 1108 may include adults age 26-35 or people who attended a conference on space exploration last year.

Community Occupying a Targeted Space Target Audiences 1110 may be audiences who share a common space physical or virtual) at a targeted time deemed significant for this invention and to whom specific TSSD and promotion materials are streamed based on the occupancy of that space at that time. Community Occupying a Targeted Space Target Audiences 1110 sharing a physical space may include sports, concert, performing arts event attendees, attendees of conferences and conventions, attendees at public festivals such as art and wine festivals or food festivals, attendees at political rallies and attendees at private events such as weddings, roasts, church services and/or observances. Community Occupying a Targeted Space Target Audiences 1110 sharing a confined space may also includes passengers on a bus, boat, plane or train. Community Occupying a Targeted Space Target Audiences 1110 sharing a virtual space may include all internet entities browsing a particular organization's website, all phone entities participating in a conference call, all attendees to a virtual web conference.

FIG. 11C is a class diagram illustrating providers of the specific TSSD according to an embodiment of the invention. In the class diagram are described the TSSD providers 1140. TSSD providers 1140 may be the originating entities for the event or activity or they may be merely submitting the FIG. 10 TSSD attributes 1002 of events, meeting, activities, and observances.

An individual provider 1141 may be a person acting in their own interest who provides TSSD related to their own activities to the TSSD delivery network.

A formal organization provider 1142 may be an organization which is certified by any authority generally recognized as a governing body and which has a formalized membership and leadership structure that provides TSSD based on its own activities or group interests to the TSSD delivery network. Examples of formal organization provider 1142 may include companies with staff, trade associations like the American Bar Association, little league sports teams, and fan clubs.

An informal association provider 1143 may be an informal group of individuals or groups which have a loose membership and leadership structure and simple affiliation mechanism. An informal association provider 1143 may also be a group of individuals that share common characteristics or derived interests but are loosely or not formally organized. An informal association provider 1143 can provide TSSD, based on its own activities or group interests to the TSSD delivery network. Examples of informal association provider 1143 groups may include pickup sports teams, adult league sports teams, internet social networks, groups of school friends, and ad-hoc parents groups at schools.

An aggregated TSSD provider 1144 may be an entity that submits TSSD to the TSSD delivery network in bulk or aggregated form. An aggregated TSSD provider 1144 can submit TSSD which may be generally not the result of their own activities, but may be a collection of activities originated by other organizations that the aggregated TSSD provider 1144 can publish for the benefit of others. Examples of an aggregated TSSD provider 1144 may include chambers of commerce and media publication companies such as newspaper, magazine, and radio/TV broadcasters.

A TSSD scanning mechanism 1145 may be a mechanism which harvests TSSD by searching data posted on the internet or published in print and radio/TV media. The scanning mechanism may be automated as with software tools which can search internet web sites, or manual labor which can scan published media. Examples of TSSD scanning mechanisms 1145 may include search-engine targeted at TSSD data and call centers targeting entertainment venues for information about upcoming events.

Figure 12:
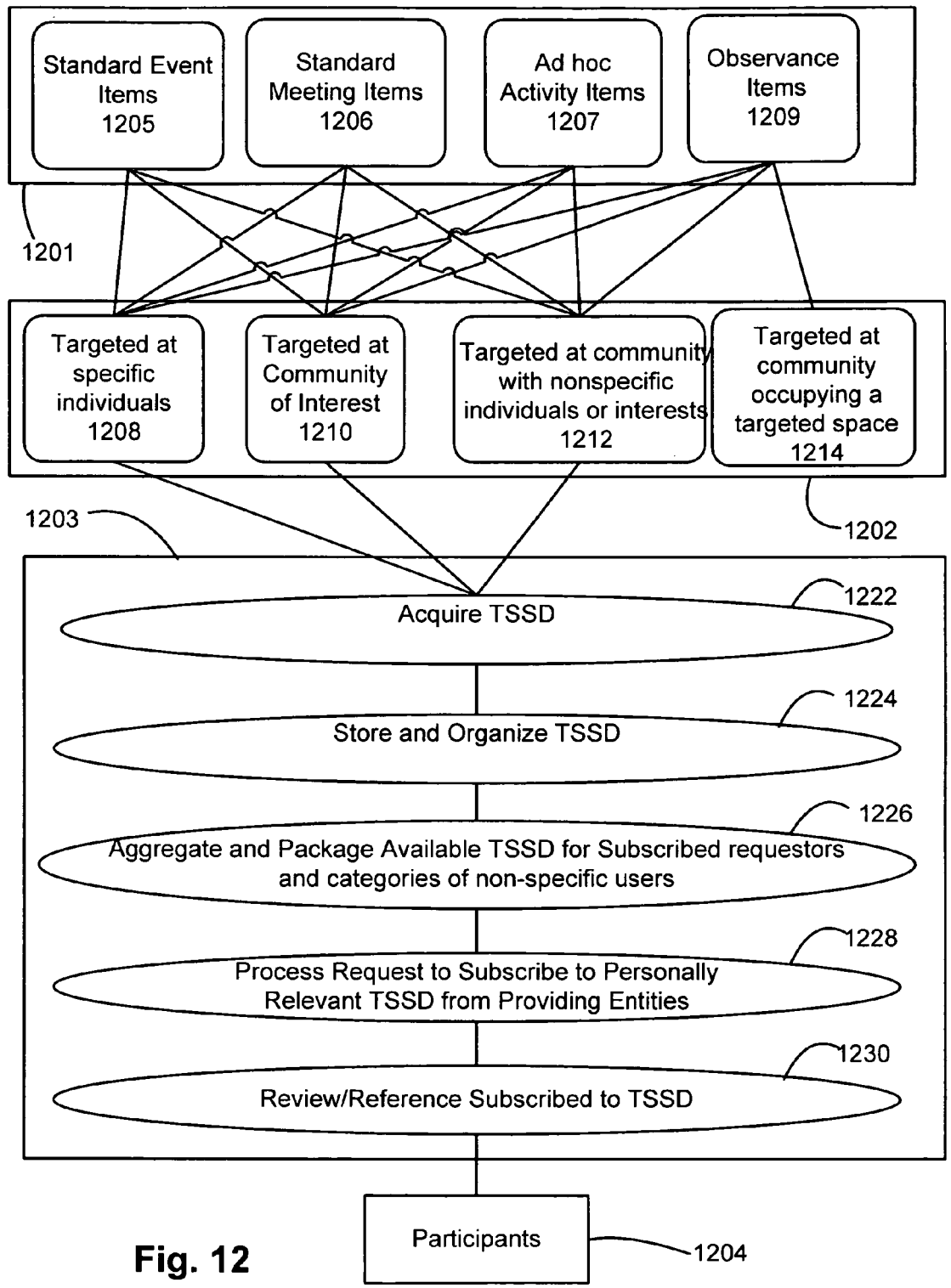
FIG. 12 is a simplified system diagram of basic functional processes and components of a time sensitive scheduling data delivery network according to one or more embodiments of the invention.

FIG. 12 is a simplified system diagram of basic functional processes and components of a TSSD delivery network according to one or more embodiments of the invention. According to one embodiment, the primary object, TSSD 1201, and the distribution requirements 1202 for the primary object TSSD 1201, use the process 1203 to maintain and distribute the primary object TSSD 1201 to and from the participants 1204.

The primary object TSSD 1201 in the system may be represented by several classes of TSSD activity sources as illustrated in FIG. 6. As shown in FIG. 12, these may include standard event items 1205, namely one time activities occurring at a fixed place and time, standard meeting items 1206, namely regularly reoccurring gathers of individuals for the purpose of conducting some meaningful activity for the group represented whether physical such as in a meeting hall, observance items 1209, namely virtual collective observance of an event, e.g., a holiday or birthday, and ad-hoc activity items 1207, namely all other types of gatherings of individuals.

The distribution requirements 1202 for the primary object TSSD 1201 may be represented as classes of requirements falling into four groups, those targeted at specific individuals 1208, targeted at a community of interest 1210, targeted at community with non-specific individuals or interests 1212 and targeted at community occupying a targeted space 1214. Thus, the distribution requirements 1202 can deliver the specific TSSD to the target via the TSSD delivery network at an appropriate time and in an appropriate manner based on the consumer's TSSD receiving device.

According to another embodiment, the processes for distribution and delivery of TSSD can be represented by their ability to perform the basic tasks: acquire TSSD 1222, store and organize TSSD 1224, aggregate and package available TSSD for subscribed requestors and categories of non-specific users 1226, process requests to subscribe to personally relevant TSSD from providing entities 1228 and review and reference subscribed to TSSD 1230 to facilitate business processes designed to sustain the TSSD delivery network. Processing requests to subscribe to personally relevant TSSD from providing entities 1228 may result in generating fulfillment requirements which in turn defines the actual distributions taking place within the TSSD delivery network. Reviewing and referencing subscribed to TSSD 1230 may allow for the promotional materials matching process to take place as one of the means for economically sustaining the invention.

The participants 1204 have a broad range of motivations and possible uses. Supplying the consumers FIG. 11B with TSSD primary object and distributing the TSSD primary object and related materials for the providers FIG. 1 IC provide important functions. Receiving subscription fees for delivery services, receiving valuable business services in barter and exchange, and receiving fees for delivery of promotional materials with TSSD objects provide economic benefits. Facilitating human resources in planning and making informed decisions, facilitating resources (human or other) being present at the right time in the right place and providing logistical support to assist society in overcoming the challenges presented by natural or man-made disasters provide social benefits for society.

The invention is preferably implemented by software, but can also be implemented in hardware or combination of hardware and software. The invention can also be embodied as computer readable code on a computer readable medium. The computer readable medium is any data storage device that can store data which can thereafter be read by a computer system. Examples of the compute readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The drawings and the foregoing description gave certain embodiments of the present invention providing a time sensitive scheduling data delivery network and related aspects. Although depicted as a number of disparate functional items, those skilled in the art will appreciate that one or more of such elements may well be combined into single functional items. Alternatively, certain elements may be split into multiple functional elements. The scope of the present invention, however, is by no means limited by these specific embodiments. Numerous variations, whether explicitly given in the specification or not, such as differences in structure, dimension, and use of material, are possible. Although the present invention has been described in considerable detail with reference to certain embodiments thereof, the invention may be variously embodied without departing from the spirit or scope of the invention. Therefore, the following claims should not be limited to the description of the embodiments contained herein in any way.

What is claimed is:

1. A method for communications network based passive delivery of time sensitive scheduling data to an entity, the method comprising:
   aggregating, via hardware, or software in combination with hardware, or a processor, time sensitive scheduling data from multiple originating organizations, affiliated groups of individuals, and individuals that create specific time sensitive scheduling data streams;
   sending via a passive delivery communications network specific time sensitive scheduling data from originating organizations, affiliated groups of individuals, and individuals;
   transmitting via the passive delivery communications network the specific time sensitive scheduling data streams aggregated from multiple originating organizations, affiliated groups of individuals, and individuals to an entity based on desirability and personal relevancy of high utility time sensitive scheduling data, without requiring a transfer of data to personal calendaring records or scheduling records;
   the transmitting including at least transmitting, via the passive delivery communications network, specific time sensitive scheduling data, the specific time sensitive scheduling data being from originating organizations, affiliated groups of individuals, and individuals; and
   accommodating passive delivery of time sensitive scheduling data to the entity based upon derived interests of the entity via a time sensitive scheduling data receiving device;
   wherein the derived interest includes at least an interest that is derived from information determined about the user that was not received via user input; and
   wherein the interest, that is derived from information determined about the user that was not received via user input, including a location of the user.

2. A method for communications network based passive delivery of time sensitive scheduling data to an entity, the method comprising:
   aggregating, via hardware, or software in combination with hardware, or a processor, time sensitive scheduling data from multiple originating organizations, affiliated groups of individuals, and individuals that create specific time sensitive scheduling data streams;
   sending via a passive delivery communications network specific time sensitive scheduling data from originating organizations, affiliated groups of individuals, and individuals;
   transmitting via the passive delivery communications network the specific time sensitive scheduling data streams aggregated from multiple originating organizations, affiliated groups of individuals, and individuals to an entity based on desirability and relevancy of high utility time sensitive scheduling data;
   the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device, wherein the time sensitive scheduling data consists of data relating to a class of entity activities originating from a class of time sensitive scheduling data activity sources.

3. A method for communications network based passive delivery of time sensitive scheduling data to an entity, the method comprising:

aggregating, via hardware, or software in combination with hardware, or a processor, time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device, wherein the time sensitive scheduling data consists of data relating to a class of entity activities originating from a class of time sensitive scheduling data activity sources, and wherein the class of entity activities is selected from the group consisting of attending, timely participating, scheduling, planning, organizing, timely responding, reserving, and a combination thereof.

4. A method for communications network based passive delivery of time sensitive scheduling data to an entity, the method comprising:

aggregating, via hardware, or software in combination with hardware, or a processor, time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting, via the passive delivery communications network, the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device, wherein the time sensitive scheduling data consists of data relating to a class of entity activities originating from a class of time sensitive scheduling data activity sources, and wherein the class of time sensitive scheduling data activity sources is selected from the group consisting of standard events, standard meetings, ad hoc activities, observances, and a combination thereof.

5. A method for communications network based passive delivery of time sensitive scheduling data to an entity, the method comprising:

aggregating, via hardware, or software in combination with hardware, or a processor, time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device, wherein the passive delivery of time sensitive scheduling data includes deriving interest for targeting a receiving entity based on information from provider organization's membership rolls and affiliation rolls as they pertain to entity items selected from the group consisting of entity-to-organization affiliations, entity-to-group affiliations, entity-to-individual affiliations, attributes from the organization's profile of the entity, and a combination thereof.

6. A method for communications network based passive delivery of time sensitive scheduling data to an entity, the method comprising:

aggregating, via hardware, or software in combination with hardware, or a processor, time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device, wherein the passive delivery of time sensitive scheduling data includes deriving interest for targeting a receiving entity wherein the derived interest is selected from the group consisting of the entity's filtering of time sensitive scheduling data, the entity's selection of promotional content accompanying the display of time sensitive scheduling data, the entity's tagging certain time sensitive scheduling data items for reminder notices of upcoming activities and observances, the entity's reservations notices for upcoming activities, the entity's need to know, and the entity's affinity groups.

7. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and personal relevancy of high utility time sensitive scheduling data, without requiring a transfer of data to personal calendaring records or scheduling records;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology;

wherein the derived interest includes at least an interest that is derived from information determined about the user that was not received via user input; and wherein the interest, that is derived from information determined about the user that was not received via user input, including a location of the user.

8. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology, wherein the time sensitive scheduling data consists of data relating to a class of entity activities originating from a class of time sensitive scheduling data activity sources.

9. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology, wherein the time sensitive scheduling data consists of data relating to a class of entity activities originating from a class of time sensitive scheduling data activity sources, and wherein the class of entity activities is selected from the group consisting of attending, timely participating, scheduling, planning, organizing, timely responding, reserving, and a combination thereof.

10. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network, specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network, specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology, wherein the time sensitive scheduling data consists of data relating to a class of entity activities originating from a class of time sensitive scheduling data activity sources, and wherein the class of time sensitive scheduling data activity sources is selected from the group consisting of standard events, standard meetings, ad hoc activities, observances, and a combination thereof.

11. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology, wherein the passive delivery of time sensitive scheduling data includes deriving interest for targeting a receiving entity based on information from provider organization's membership rolls and affiliation rolls as they pertain to entity items selected from the group consisting of entity-to-organization affiliations, entity-to-group affiliations, entity-to-individual affiliations, attributes from the organization's profile of the entity, and a combination thereof.

12. A system for communications network based passive delivery of time sensitive scheduling data via a communication technology via a time sensitive scheduling data receiving device to an entity, the system comprising:

a time sensitive scheduling data center for storing time sensitive scheduling data, collecting time sensitive scheduling from an entity, and sending time sensitive scheduling data to the entity upon the entity being authenticated and validated;

connectivity medium communication interfaces for transmitting authentication and validation information and time sensitive scheduling data between the time sensitive scheduling data center, a communication technology, and a time sensitive scheduling data receiving device;

a communication technology suitable for receiving and sending the passive delivery of time sensitive scheduling data;

processors for processing executable instructions for:

aggregating time sensitive scheduling data from multiple originating organizations, affiliated groups of individuals, and individuals that create specific time sensitive scheduling data streams;

sending via a passive delivery communications network specific time sensitive scheduling data from originating organizations, affiliated groups of individuals, and individuals;

transmitting via the passive delivery communications network the specific time sensitive scheduling data streams aggregated from multiple originating organizations, affiliated groups of individuals, and individuals to an entity based on desirability and relevancy of high utility time sensitive scheduling data;

the transmitting including at least transmitting, via the passive delivery communications network specific time sensitive scheduling data, the specific time sensitive scheduling data being from originating organizations, affiliated groups of individuals, and individuals; and accommodating passive delivery of time sensitive scheduling data to the entity based upon derived interests of the entity via a time sensitive scheduling data receiving device; and a time sensitive scheduling data receiving device for receiving and sending authentication and validation information and time sensitive scheduling data to the time sensitive scheduling data center via the connectivity medium communication interfaces via a communication technology, wherein the passive delivery of time sensitive scheduling data includes deriving interest for targeting a receiving entity wherein the derived interest is selected from the group consisting of the entity's filtering of time sensitive scheduling data, the entity's selection of promotional content accompanying the display of time sensitive scheduling data, the entity's tagging certain time sensitive scheduling data items for reminder notices of upcoming activities and observances, the entity's reservations notices for upcoming activities, the entity's need to know, and the entity's affinity groups.

13. A time sensitive scheduling data receiving device suitable for providing the communications network based passive delivery of time sensitive scheduling data to an entity, comprising:

a display for displaying a message in accordance with time sensitive scheduling data;

a time sensitive scheduling data communication interface arranged to send and receive signals from authentication and fulfillment servers of a time sensitive scheduling data network;

a processor for processing executable authentication and validation instructions; and a controller in communication with the processor and the time sensitive scheduling data communication interface arranged to send and receive signals from the authentication and fulfillment servers of the time sensitive scheduling data network to determine if a time sensitive scheduling data receiving entity is authenticated and validated to receive time sensitive scheduling data from the fulfillment server wherein when the controller determines that the time sensitive scheduling data receiving entity is authenticated and validated to receive time sensitive scheduling data from the fulfillment server, then the processor notifies the fulfillment server to send time sensitive scheduling data to the receiving entity via the time sensitive scheduling data communication interface;

wherein the receiving entity being arranged to, via the passive delivery communications network, receive specific time sensitive scheduling data streams aggregated from multiple originating organizations, affiliated groups of individuals, and individuals to an entity based on desirability and personal relevancy of high utility time sensitive scheduling data, without requiring a transfer of data to personal calendaring records or scheduling records;

wherein the time sensitive scheduling data being based upon derived interests of the entity; the derived interest includes at least an interest that is derived from information determined about the user that was not received via user input; and wherein the interest, that is derived from information determined about the user that was not received via user input, including a location of the user.

14. A time sensitive scheduling data receiving device suitable for providing the communications network based passive delivery of time sensitive scheduling data to an entity, comprising:
- a display for displaying a message in accordance with time sensitive scheduling data;
- a time sensitive scheduling data communication interface arranged to send and receive signals from authentication and fulfillment servers of a time sensitive scheduling data network;
- a processor for processing executable authentication and validation instructions; and
- a controller in communication with the processor and the time sensitive scheduling data communication interface arranged to send and receive signals from the authentication and fulfillment servers of the time sensitive scheduling data network to determine if a time sensitive scheduling data receiving entity is authenticated and validated to receive time sensitive scheduling data from the fulfillment server wherein when the controller determines that the time sensitive scheduling data receiving entity is authenticated and validated to receive time sensitive scheduling data from the fulfillment server, then the processor notifies the fulfillment server to send time sensitive scheduling data to the receiving entity via the time sensitive scheduling data communication interface,
- wherein the time sensitive scheduling data receiving device is selected from the group consisting of non-web browser time sensitive scheduling data receiving devices and web browser time sensitive scheduling data receiving devices.

15. A computer program product executable by a computer processor for processing the passive delivery of time sensitive scheduling data generated via a communications network to an entity, comprising:
- computer code for aggregating time sensitive scheduling data from multiple originating organizations, affiliated groups of individuals, and individuals that create time sensitive scheduling data streams;
- computer code for sending via a passive delivery communications network specific time sensitive scheduling data from originating organizations, affiliated groups of individuals, and individuals;
- computer code for transmitting via the passive delivery communications network specific time sensitive scheduling data streams aggregated from multiple originating organizations, affiliated groups of individuals, and individuals to an entity based on desirability and personal relevancy of high utility time sensitive scheduling data, without requiring a transfer of data to a personal calendaring records or scheduling records;
- the computer code for transmitting causing a transmitting of, via the passive delivery communications network, specific time sensitive scheduling data, the specific time sensitive scheduling data being from originating organizations, affiliated groups of individuals, and individuals;
- computer code for accommodating passive delivery of time sensitive scheduling data to the entity based upon derived interests of the entity via a time sensitive scheduling receiving device;

wherein the derived interest includes at least an interest that is derived from information determined about the user that was not received via user input; and wherein the interest, that is derived from information determined about the user that was not received via user input, including a location of the user; and non-transitory computer readable medium for storing the computer code.

16. A computer program product executable by a computer processor for processing the passive delivery of time sensitive scheduling data generated via a communications network to an entity, comprising:
- computer code for aggregating time sensitive scheduling data from multiple originating organizations, affiliated groups of individuals, and individuals that create time sensitive scheduling data streams;
- computer code for sending via a passive delivery communications network specific time sensitive scheduling data from originating organizations, affiliated groups of individuals, and individuals;
- computer code for transmitting via the passive delivery communications network specific time sensitive scheduling data streams aggregated from multiple originating organizations, affiliated groups of individuals, and individuals to an entity based on desirability and relevancy of high utility time sensitive scheduling data;
- computer code for the transmitting including at least transmitting, via the passive delivery communications network, specific time sensitive scheduling data, the specific time sensitive scheduling data being from originating organizations, affiliated groups of individuals, and individuals;
- computer code for accommodating passive delivery of time sensitive scheduling data to the entity based upon derived interests of the entity via a time sensitive scheduling receiving device; and
- non-transitory computer readable medium for storing the computer code,
- wherein the time sensitive scheduling data consists of data relating to a class of entity activities originating from a class of time sensitive scheduling data activity sources.

17. A computer program product executable by a computer processor for processing the passive delivery of time sensitive scheduling data generated via a communications network to an entity, comprising:
- computer code for aggregating time sensitive scheduling data from multiple originating organizations, affiliated groups of individuals, and individuals that create time sensitive scheduling data streams;
- computer code for sending via a passive delivery communications network specific time sensitive scheduling data from originating organizations, affiliated groups of individuals, and individuals;
- computer code for transmitting via the passive delivery communications network specific time sensitive scheduling data streams aggregated from multiple originating organizations, affiliated groups of individuals, and individuals to an entity based on desirability and relevancy of high utility time sensitive scheduling data;
- the computer code for transmitting causing the transmitting of, via the passive delivery communications network, specific time sensitive scheduling data, the specific time sensitive scheduling data being from originating organizations, affiliated groups of individuals, and individuals;

computer code for accommodating passive delivery of time sensitive scheduling data to the entity based upon derived interests of the entity via a time sensitive scheduling receiving device; and non-transitory computer readable medium for storing the computer code, wherein the time sensitive scheduling data consists of data relating to a class of entity activities originating from a class of time sensitive scheduling data activity sources, and wherein the class of entity activities is selected from the group consisting of attending, timely participating, scheduling, planning, organizing, timely responding, reserving, and a combination thereof.

18. A computer program product executable by a computer processor for processing the passive delivery of time sensitive scheduling data generated via a communications network to an entity, comprising:

computer code for aggregating time sensitive scheduling data from multiple originating organizations, affiliated groups of individuals, and individuals that create time sensitive scheduling data streams;

computer code for sending via a passive delivery communications network specific time sensitive scheduling data from originating organizations, affiliated groups of individuals, and individuals;

computer code for transmitting via the passive delivery communications network specific time sensitive scheduling data streams aggregated from multiple originating organizations, affiliated groups of individuals, and individuals to an entity based on desirability and relevancy of high utility time sensitive scheduling data;

computer code for the transmitting including at least transmitting, via the passive delivery communications network, specific time sensitive scheduling data, the specific time sensitive scheduling data being from originating organizations, affiliated groups of individuals, and individuals;

computer code for accommodating passive delivery of time sensitive scheduling data to the entity based upon derived interests of the entity via a time sensitive scheduling receiving device; and non-transitory computer readable medium for storing the computer code, wherein the time sensitive scheduling data consists of data relating to a class of entity activities originating from a class of time sensitive scheduling data activity sources, and wherein the class of time sensitive scheduling data activity sources is selected from the group consisting of standard events, standard meetings, ad hoc activities, observances, and a combination thereof.

19. A computer program product executable by a computer processor for processing the passive delivery of time sensitive scheduling data generated via a communications network to an entity, comprising:

computer code for aggregating time sensitive scheduling data from multiple originating organizations, affiliated groups of individuals, and individuals that create time sensitive scheduling data streams;

computer code for sending via a passive delivery communications network specific time sensitive scheduling data from originating organizations, affiliated groups of individuals, and individuals;

computer code for transmitting via the passive delivery communications network specific time sensitive scheduling data streams aggregated from multiple originating organizations, affiliated groups of individuals, and individuals to an entity based on desirability and relevancy of high utility time sensitive scheduling data;

computer code for the transmitting including at least transmitting, via the passive delivery communications network, specific time sensitive scheduling data, the specific time sensitive scheduling data being from originating organizations, affiliated groups of individuals, and individuals;

computer code for accommodating passive delivery of time sensitive scheduling data to the entity based upon derived interests of the entity via a time sensitive scheduling receiving device; and non-transitory computer readable medium for storing the computer code, wherein the passive delivery of time sensitive scheduling data includes deriving interest for targeting a receiving entity based on information from provider organization's membership rolls and affiliation rolls as they pertain to entity items selected from the group consisting of entity-to-organization affiliations, entity-to-group affiliations, entity-to-individual affiliations, attributes from the organization's profile of the entity, and a combination thereof.

20. A computer program product executable by a computer processor for processing the passive delivery of time sensitive scheduling data generated via a communications network to an entity, comprising:

computer code for aggregating time sensitive scheduling data from multiple originating organizations, affiliated groups of individuals, and individuals that create time sensitive scheduling data streams;

computer code for sending via a passive delivery communications network specific time sensitive scheduling data from originating organizations, affiliated groups of individuals, and individuals;

computer code for transmitting via the passive delivery communications network specific time sensitive scheduling data streams aggregated from multiple originating organizations, affiliated groups of individuals, and individuals to an entity based on desirability and relevancy of high utility time sensitive scheduling data;

computer code for the transmitting including at least transmitting, via the passive delivery communications network, specific time sensitive scheduling data, the specific time sensitive scheduling data being from originating organizations, affiliated groups of individuals, and individuals;

computer code for accommodating passive delivery of time sensitive scheduling data to the entity based upon derived interests of the entity via a time sensitive scheduling receiving device; and non-transitory computer readable medium for storing the computer code, wherein the passive delivery of time sensitive scheduling data includes deriving interest for targeting a receiving entity wherein the derived interest is selected from the group consisting of the entity's filtering of time sensitive scheduling data, the entity's selection of promotional content accompanying the display of time sensitive scheduling data, the entity's tagging certain time sensitive scheduling data items for reminder notices of upcoming activities and observances, the entity's reservations notices for upcoming activities, the entity's need to know, and the entity's affinity groups.

21. A system for simultaneous passive delivery of time sensitive scheduling data via multiple communication technologies via an array of multiple communication time sensitive scheduling data receiving devices to an entity, the system comprising:
- a time sensitive scheduling data center for storing time sensitive scheduling data, collecting time sensitive scheduling from an entity, and sending time sensitive scheduling data to the entity upon the entity being authenticated and validated;
- connectivity medium communication interfaces for transmitting authentication and validation information and time sensitive scheduling data between the time sensitive scheduling data center, multiple communication technologies, and multiple communication time sensitive scheduling data receiving devices;
- multiple communication technologies suitable for receiving and sending the passive delivery of time sensitive scheduling data;
- processors for processing executable instructions; and
- multiple communication time sensitive scheduling data receiving devices for receiving and sending authentication and validation information and time sensitive scheduling data to the time sensitive scheduling data center via the connectivity medium communication interfaces via the multiple communication technologies;
- wherein the multiple communication technologies arranged to, via the connectivity medium communication interfaces, receive specific time sensitive scheduling data streams aggregated from multiple originating organizations, affiliated groups of individuals, and individuals to an entity based on desirability and personal relevancy of high utility time sensitive scheduling data, without requiring a transfer of data to a personal calendaring records or scheduling records;
- wherein the time sensitive scheduling data being based upon derived interests of the entity; the derived interest includes at least an interest that is derived from information determined about the user that was not received via user input; and
- wherein the interest, that is derived from information determined about the user that was not received via user input, including a location of the user.

22. A system for simultaneous passive delivery of time sensitive scheduling data via multiple communication technologies via an array of multiple communication time sensitive scheduling data receiving devices to an entity, the system comprising:
- a time sensitive scheduling data center for storing time sensitive scheduling data, collecting time sensitive scheduling from an entity, and sending time sensitive scheduling data to the entity upon the entity being authenticated and validated;
- connectivity medium communication interfaces for transmitting authentication and validation information and time sensitive scheduling data between the time sensitive scheduling data center, multiple communication technologies, and multiple communication time sensitive scheduling data receiving devices;
- multiple communication technologies suitable for receiving and sending the passive delivery of time sensitive scheduling data;
- processors for processing executable instructions; and
- multiple communication time sensitive scheduling data receiving devices for receiving and sending authentication and validation information and time sensitive scheduling data to the time sensitive scheduling data center via the connectivity medium communication interfaces via multiple communication technologies,
- wherein the multiple communication time sensitive scheduling data receiving devices include at least one portable display time sensitive scheduling data receiving device selected from the group consisting of mobile computing devices, personal digital assistants, cellular phones, personal computers, portable workstations, and a combination thereof.

23. A system for simultaneous passive delivery of time sensitive scheduling data via multiple communication technologies via an array of multiple communication time sensitive scheduling data receiving devices to an entity, the system comprising:
- a time sensitive scheduling data center for storing time sensitive scheduling data, collecting time sensitive scheduling from an entity, and sending time sensitive scheduling data to the entity upon the entity being authenticated and validated;
- connectivity medium communication interfaces for transmitting authentication and validation information and time sensitive scheduling data between the time sensitive scheduling data center, multiple communication technologies, and multiple communication time sensitive scheduling data receiving devices;
- multiple communication technologies suitable for receiving and sending the passive delivery of time sensitive scheduling data;
- processors for processing executable instructions; and
- multiple communication time sensitive scheduling data receiving devices for receiving and sending authentication and validation information and time sensitive scheduling data to the time sensitive scheduling data center via the connectivity medium communication interfaces via multiple communication technologies,
- wherein the multiple communication time sensitive scheduling data receiving devices include at least one fixed placement display time sensitive scheduling data receiving device display location selected from the group consisting of public place business display screens, home entertainment appliance display screens, business display screens in a public place, business display screens on company property in public areas, business display screens on company property in private areas, and a combination thereof.

24. A system for simultaneous passive delivery of time sensitive scheduling data via multiple communication technologies via an array of multiple communication time sensitive scheduling data receiving devices to an entity, the system comprising:
- a time sensitive scheduling data center for storing time sensitive scheduling data, collecting time sensitive scheduling from an entity, and sending time sensitive scheduling data to the entity upon the entity being authenticated and validated;
- connectivity medium communication interfaces for transmitting authentication and validation information and time sensitive scheduling data between the time sensitive scheduling data center, multiple communication technologies, and multiple communication time sensitive scheduling data receiving devices;
- multiple communication technologies suitable for receiving and sending the passive delivery of time sensitive scheduling data:
- processors for processing executable instructions; and
- multiple communication time sensitive scheduling data receiving devices for receiving and sending authentication and validation information and time sensitive scheduling data to the time sensitive scheduling data center via the connectivity medium communication interfaces via multiple communication technologies, wherein the multiple communication time sensitive scheduling data receiving devices include at least one linked device in the fixed placement display time sensitive scheduling data receiving devices selected from the group consisting of computers that run a single function communications network software, computers that run browsers linked into a time sensitive scheduling data display website, computers that run a time sensitive scheduling data tuner and display software, set top tuner for home entertainment appliances, stand alone tuner with web access, and a combination thereof.

25. A fulfillment system, comprising:
a fulfillment server, implemented by hardware, or software in combination with hardware, or a processor, delivering time sensitive scheduling data and business policy determined collateral content to a receiving entity based on applying rules of a time sensitive scheduling data delivery business process according to a receiving entity's affiliations and profile;
an authentication server, implemented by hardware, or software in combination with hardware, or a processor, recognizing valid time sensitive scheduling data delivery network receiving entities and issuing authentication keys to valid time sensitive scheduling data delivery network receiving entities independent of the method the receiving entity employs to access the time sensitive scheduling data delivery network to receive a time sensitive scheduling data stream;
a web-access server, implemented by hardware, or software in combination with hardware, or a processor, controlling how data is received from and pushed out to web browser devices;
a subscriber profile server, implemented by hardware, or software in combination with hardware, or a processor, managing and provisioning of subscription and subscriber profiles;
a subscriptions/subscriber server, implemented by hardware, or software in combination with hardware, or a processor, managing and provisioning of subscriber's subscription profiles;
an acquisition system, implemented by hardware, or software in combination with hardware, or a processor, comprising:
  organization-managed activity acquisitions servers harvesting activity data created and maintained on the server by organization members providing the organization's activity data;
  individual-managed activity acquisitions servers harvesting activity data recorded and maintained on the server by consuming individuals providing the activity data of other individuals and their own personal activity data; and
foreign activity acquisition servers harvesting activity data recorded on the server by organizations providing the activity data of other individuals and other organizations;
a time sensitive scheduling data server assimilating time sensitive scheduling data, fulfilling time sensitive scheduling data requests based on a subscriptions list, and processing time sensitive scheduling data updates;
a promotions server managing promotion time sensitive scheduling data from sponsors, promoters, and advertisers, and managing profile descriptors, usage statistics, and request ID;
a user relationship server generating statistics, process status and data status for time sensitive scheduling data delivery network user linkage and behavioral data, and lead generation, assimilating usage statistics and behavioral data, administering individual linkage data, storing usage statistics, behavioral data, and individual data updates;
a data store; and
time sensitive scheduling data receiving devices.

26. A system for the passive delivery of targeted time sensitive scheduling data items of derived interest to targeted audiences, the system comprising one or more hardware devices having a processor that implements machine instructions for automatically retrieving information for and sending information to:
personally targeted audiences including individuals to whom specific time sensitive scheduling data and promotional material are streamed based on attributes and preferences explicit in their personal profile in the time sensitive scheduling data delivery network, the network implemented by hardware, software in combination with hardware, or a processor;
community of interest target audiences corresponding to audiences who share identified common affiliations deemed significant and to whom specific time sensitive scheduling data and promotion materials are streamed based on their affiliations, common attributes derived for a community group, and specific preferences of significant members of the community group;
community nonspecific affiliation target audiences sharing identified common attributes deemed significant and to whom specific time sensitive scheduling data and promotion materials are streamed based on the common attributes and affiliations derived for the community group, and the specific preferences of significant members of the community group; and
community occupying a targeted space target audiences sharing a common space at a targeted time deemed significant and to whom specific time sensitive scheduling data and promotion materials are streamed based on occupancy of that space at that time.

27. The system of claim 26, wherein the common space is selected from the group consisting of a physical space and a virtual space.

28. A time sensitive scheduling data activity source system comprising one or more hardware devices storing therein:
standard events representing routine and non-routine gatherings of groups of individuals in association for purposes other than conducting the regular business of the associations;
standard meetings representing generally recurring gatherings of same individuals for the purpose of conducting the business of the association;
observances representing mass recognitions for purposes of commemorating an event or occurrence; and
ad hoc activities representing all other pre-announced gatherings of individuals for social purposes.

29. The system of claim 28, wherein the groups of individuals in association are selected from the group consisting of same groups of individuals in association and ad hoc groups of individuals in association.

30. The system of claim 28, wherein the mass recognitions are selected from the group consisting of an ad hoc event, ad hoc gatherings of same groups of individuals in association, routine gatherings of same groups of individuals, ad hoc gatherings of ad hoc groups of individuals in association, and routine gatherings of ad hoc groups of individuals in association.

31. A system for the passive delivery of aggregated personal time sensitive scheduling data from multiple sources, the system comprising one or more hardware devices storing therein:
- specific personal time sensitive scheduling data aggregated from multiple originating organizations, affiliated groups of individuals, and individuals to an entity based on desirability and relevancy of high utility time sensitive scheduling data;
- aggregated specific personal time sensitive scheduling data streams transmitting to the entity based on the time sensitive scheduling data having desirability and relevancy of high utility; and
- specific personal time sensitive scheduling data delivered to a time sensitive scheduling data receiving device.

32. A system for acquiring time sensitive scheduling data from a combination of time sensitive scheduling data feeds, the system comprising:
- product client data feeds, implemented by hardware, or software in combination with hardware, or a processor, from which a time sensitive scheduling data acquisition function acquires time sensitive scheduling data from provider products wherein the data feeds from the provider products are characterized by those applications and activities that produce activity coordination data streams as a by-product of use;
- embedded data feeds, implemented by hardware, or software in combination with hardware, or a processor, from which the time sensitive scheduling data acquisition function acquires the data feeds from embedded time sensitive scheduling data feed modules wherein the embedded data feeds involve foreign organizations who integrate the time sensitive scheduling data feed modules within their products;
- purchasing and bartering time sensitive scheduling data feeds, implemented by hardware, or software in combination with hardware, or a processor, from which the time sensitive scheduling data acquisition function acquires the data feeds by purchasing and bartering data feeds;
- research team scans data feeds, implemented by hardware, or software in combination with hardware, or a processor, from which the time sensitive scheduling data acquisition function acquires the data feeds from research team efforts to scan private and public data sources; and
- call center survey data feeds, implemented by hardware, or software in combination with hardware, or a processor, from which the time sensitive scheduling data acquisition function acquires the data feeds from call center surveys of clients involving direct contact information transfers.

33. The system of claim 32, wherein the data feed modules are selected from the group consisting of foreign organization's software, applications, tools, websites, and a combination thereof.

34. The system of claim 32, wherein the data feeds are selected from the group consisting of businesses, associations, individuals, and a combination thereof.

35. The system of claim 32, wherein the data sources are selected from the group consisting of websites, association publications, print media community calendars, and a combination thereof.

* * * * *